(12) United States Patent
Ugolin

(10) Patent No.: US 8,388,706 B2
(45) Date of Patent: Mar. 5, 2013

(54) METHOD USING SOLAR ENERGY, MICROWAVES AND PLASMAS TO PRODUCE A LIQUID FUEL AND HYDROGEN FROM BIOMASS OR FOSSIL COAL

(76) Inventor: Nicolas Ugolin, Paris (FR)

( * ) Notice: Subject to any disclaimer, the term of this patent is extended or adjusted under 35 U.S.C. 154(b) by 486 days.

(21) Appl. No.: 12/742,980

(22) PCT Filed: Nov. 14, 2008

(86) PCT No.: PCT/FR2008/001606
§ 371 (c)(1),
(2), (4) Date: May 14, 2010

(87) PCT Pub. No.: WO2009/098375
PCT Pub. Date: Aug. 13, 2009

(65) Prior Publication Data
US 2010/0258429 A1   Oct. 14, 2010

(30) Foreign Application Priority Data

Nov. 16, 2007   (FR) .................................. 07 08031
Jan. 25, 2008   (FR) .................................. 08 00384

(51) Int. Cl.
*C10J 3/08* (2006.01)
*C10J 3/18* (2006.01)
*B01J 7/00* (2006.01)
*C01B 6/24* (2006.01)
*C01B 3/02* (2006.01)

(52) U.S. Cl. .................... 48/62 R; 48/61; 48/77; 48/65; 423/644; 423/648.1

(58) Field of Classification Search ............ 48/61, 62 R, 48/65, 77
See application file for complete search history.

(56) References Cited

U.S. PATENT DOCUMENTS

| 4,177,120 A | 12/1979 | Zenty |
| 4,229,184 A | 10/1980 | Gregg |
| 4,488,935 A | 12/1984 | Ruhe |

(Continued)

FOREIGN PATENT DOCUMENTS

| WO | 2004/041974 A1 | 5/2004 |
| WO | 2006/048224 A2 | 5/2006 |
| WO | 2008/027980 A1 | 3/2008 |

OTHER PUBLICATIONS

International Search Report, dated Jul. 13, 2009, from corresponding PCT application.

*Primary Examiner* — Matthew Merkling
(74) *Attorney, Agent, or Firm* — Young & Thompson

(57) ABSTRACT

A system uses thermal solar energy coupled with microwaves and plasma for producing carbon monoxide (CO) and dihydrogen (H2) from carbonated compounds (biomass, domestic waste, sludge from waste water, fossil coal), wherein the obtained gaseous mixture yields, amongst others, hydrocarbon fuels (olefins, paraffin), esters, and alcohols via a Fischer-Tropsch synthesis. In a first step the carbonated compounds are roasted and pyrolized to produce char and dry coal, and a mixture of superheated gases containing CO2, steam, tars and non-condensable volatile materials. The method includes in a second step, and from the pyrolyis products (char or coal, gas mixture), generating a syngas substantially containing a mixture of carbon monoxide and dihydrogen, the mixture being used in Fischer-Tropsch synthesis units. After the Fischer-Tropsch step, the synthesis products are separated in a distillation column after heating in solar furnaces of mixed furnaces (solar/microwave).

14 Claims, 14 Drawing Sheets

U.S. PATENT DOCUMENTS

| | | | |
|---|---|---|---|
| 4,588,478 A * | 5/1986 | Warzel | 202/99 |
| 4,643,809 A * | 2/1987 | Botts et al. | 204/155 |
| 5,647,877 A * | 7/1997 | Epstein | 48/210 |
| 6,039,774 A * | 3/2000 | McMullen et al. | 48/102 A |
| 6,113,865 A | 9/2000 | Dammann et al. | |
| 8,187,550 B2 * | 5/2012 | McAlister | 422/186 |
| 8,287,610 B2 * | 10/2012 | Weimer et al. | 48/197 R |
| 2003/0097843 A1 * | 5/2003 | Sugarmen et al. | 60/780 |

* cited by examiner

METHOD USING SOLAR ENERGY, MICROWAVES AND PLASMAS TO PRODUCE A LIQUID FUEL AND HYDROGEN FROM BIOMASS OR FOSSIL COAL

BACKGROUND OF THE INVENTION

The exhaustion of petroleum resources and the carbon dioxide (CO2) pollution produced by burning petroleum products (one of the main causes of global warming) make it necessary to develop less polluting alternative energy production processes, enabling the quality of life in industrialized countries to be preserved and the ever-increasing need for energy in emerging countries to be addressed. Indeed, the global energy consumption was 5500 Mtoe in 1971, 10300 Mtoe in 2002 and is estimated to be at 16500 Mtoe in 2030.

It is necessary, however, to distinguish:
- energy requirements intended for industrial and urban development, which can be qualified as static (for which numerous solutions are emerging (essentially, solar, nuclear, hydraulic, geothermic and wind power production); from
- energy requirements related to transportation, which require storage and transport of energy by the actual vehicle, with the exception of electric track vehicles such as trains and trams.

For this second requirement, related to transportation, the solutions appear to be less obvious, because the fuel(s) used in the various modes of transportation must comply with a number of constraints.

They must be easily transportable and storable under secure conditions equivalent at least to what currently exists for petroleum products, have a pollution balance (production—use below that of hydrocarbons) and finally be economically viable with respect to petroleum products. The problem is further complicated by taking into account the constraints of a fuel compatible with air transport.

Various methods are taking shape for the production of fuel for vehicles:
- the production of biofuel (alcohol, ester),
- the use of dihydrogen as a fuel in fuel cells, or thermal engines,
- the use of efficient batteries in electric vehicles,
- the use of biomass or coal to produce fuel.

The production of biofuel, alcohol or fatty acid ester, appears at first sight to be promising and is already being implemented in different countries. However, these solutions are not perfect; indeed, the crop acreage necessary for offering energy self-reliance is enormous, and represents more than all currently existing crop acreage. Therefore, these crops are competing with food crops. The raw materials for producing these biofuels are often food products, such as corn, wheat, and so on. Intense harvesting of such biofuels, in addition to creating an imbalance in the global agri-food economy, particularly that of emerging and developing countries, would involve a high risk of famine and significant ecological disruptions.

Moreover, certain modes of production of these biofuels have a very low energy yield and a high pollution balance with regard to petroleum. For example, we can cite the production of ethanol from beetroot, or the production of fatty acids or ester from rapeseed.

The use of dihydrogen as a fuel appears to be a smart solution for a fuel suitable for use. However, the problem of production of non-polluting dihydrogen with a production cost equivalent to petroleum products has not yet been solved.

Moreover, the use of this fuel requires overcoming a number of difficulties for storage and distribution thereof in view of its hazards.

The storage of electric energy in batteries to be used in electric or electric-thermal hybrid vehicles is one of the solutions proposed by numerous automobile manufacturers. This solution involves the production of efficient batteries at a low cost, generating little to no pollution, whether in production or recycling. In addition, the problem of producing an alternative fuel persists for vehicles with electric-thermal hybrid-powered vehicles.

To our knowledge, no viable aeronautic propulsion solution based on fuel cells or electric batteries has been proposed.

The use of biomass and in particular plant waste, cellulose or non-upgraded agricultural products represents an important resource of raw materials for the production of liquid fuels, as well as for non-recyclable plastic materials at the end of their working life.

Fossil coal reserves can satisfy the liquid fuel requirements for several more decades.

However, whether it is for biomass or fossil coal, the gasification methods used to produce liquid fuel from these raw materials still produce too much CO2 pollution, which can represent up to 20 to 40% of gases produced.

Due to this loss of carbon in the form of CO2, the production of fuel from biomass by gasification has a pollution balance only slightly better than that of petroleum, which quickly becomes worse if the problems of control of CO2 emissions during biomass production and transport thereof to conversion plants are not managed. By minimizing losses of carbon in the form of CO2 during the production of fuel from biomass, this balance may be brought to or near equilibrium, if the CO2 produced is successfully captured or more efficiently converted into fuel. Indeed, under these conditions, the biomasses would have a carbon proportion equivalent to that released when burning synthetic fuel.

For fossil coal, the situation is entirely different. Regardless of the mode of conversion of coal into fuel, the burning of the fuel will release CO2 from fossil carbon, in addition to undesirable byproducts (sulfur, sulfide) into the atmosphere.

A method of gasification without the release of CO2 will improve the pollution balance of fuels obtained with respect to petroleum products. However, to render the pollution balance of fossil fuels equivalent to the balance of fuels produced from biomass, CO2 capture or conversion solutions must be implemented at the sites where the biofuels are used, i.e. in the vehicles.

An increasing number of methods enabling CO2 to be converted into an upgradable product are being developed; however, very few of them describe solutions suitable for the biomass or coal gasification industry.

Two major types of CO2 conversion processes can be cited:
- catalytic methods consisting of reducing CO2 into compounds such as methanol, formaldehyde or formic acid, which are directly upgradable, and
- electrochemical gas-phase processes consisting of reducing CO2 into (carbon monoxide) CO and into (dihydrogen) H2 by electrical discharge.

It should be noted that electrochemical methods in solution enable CO2 to be converted into formic acid.

While industrially upgradable, methanol, formaldehyde and formic acid enable, only with great difficulty, hydrocarbons to be synthesized by processes such as the Fischer-Tropsch (FT) process.

Electrochemical gas-phase processes can produce CO and H2 from CO2 gas. Gliding arc (GlidArc) methods are especially promising, although they consume large amounts of energy (several kilovolts per m³ of gas produced). The GlidArc processes described at present often require, in order to reduce the CO2, the use of gas additives such as sulfuric acid (H2S) or methane (CH4). These methods are not described for oxidizing char and coal particles. The additives promoting reactions are always gases. The geometries described for the GlidArc processes make it very difficult to optimize the efficiency of the different reactions according to the flows of the different gases. The GlidArc methods generate so-called non-equilibrium plasmas. No description takes into account mixed methods involving, concomitantly or alternately, a non-equilibrium plasma with a thermodynamic plasma. Similarly, no study has taken into account processes involving plasmas of optical origin, non-equilibrium electric plasmas and thermodynamic plasmas. No study takes into account processes of orienting reactions occurring in a plasma by enrichments with metals, particles or catalysts, thus promoting a given reaction in a plasma.

The reduction of CO2 into CO and H2 is a major technological challenge in the hydrocarbon synthesis industry. Indeed, a large part (30 to 40%) of the raw material (coal, char) is lost in the form of CO2, which makes this industry, in addition to economically costly, highly polluting.

We propose a process and a series of alternative devices, suitable for gasification of biomass and coal, enabling a syngas (CO—H2) to be produced while reducing the energy costs of the biomass or the coal used for the synthesis. Indeed, the energy necessary for the different reactions is normally provided by burning a portion of the char or the coal. In the method described here, a large part of this energy is replaced by solar energy and energy of different plasmas produced throughout the process. The different plasmas used have mixed origins and the electric energy necessary for their production comes from renewable energy (solar, wind, or energy coming from thermal recovery in the device. The losses of carbon, in the form of CO2, are minimized by the use of plasmas of different types (electric, microwave, ICP, optical). These plasmas are used throughout the process as additional means for oxidizing the carbon into CO and reducing the CO2 into CO. The action of the plasmas is amplified by their enrichment with different metals of elements (Mg, Mn, Al, Fe, Si, SiO2, etc.).

OBJECTS AND SUMMARY OF THE INVENTION

The invention consists of a process organizing a series of functional units microwave energy complemented with solar thermal energy and/or plasma energy in order to carry out the different steps involved in the gasification of carbon-rich compounds such as, for example, biomass or coal, in order to produce a syngas (CO, H2) intended, for example, for the synthesis of liquid fuels.

In general, any compound containing carbon may be suitable. In addition to biomass, it is possible to use garbage, paper pulp, sludge from wastewater purification or pressing, and so on.

Throughout this document, the materials used for gasification will be referred to as a substrate. The substrate will preferably be packaged or agglomerated in more or less moist particles or granules, preferably with a moisture content of 10 to 30%.

The composition of granules will preferably be reproducible for example by a mixture of materials of different origins (biomass, wastewater purification sludge, garbage, paper pulp, etc.). The proportion of the different materials necessary for producing the granules is preferably defined spontaneously, during the mixing of said materials, by a basic analysis of the materials used in the composition of the granules. For example, a LIBS (Laser Induced Breakdown Spectroscopy) process will be used to define the basic composition of different materials that will be mixed according to proportions defined by the analysis in order to provide a granule with a basic reproducible composition.

After a possible step of preparing the substrate, the process of gasification of carbon-containing compounds in order to produce a syngas containing primarily CO and H2 can be broken down into two main steps:

A) a first step of torrefaction pyrolysis of the compounds, into char and pyrolysis gas, in a solar microwave reactor, caused by heating the compounds contained in said solar microwave reactor by synergistic thermal energy provided jointly by the heating of the walls of the reactor owing to the concentration by convergence or reflection of solar radiation at the surface of said walls, and by microwaves injected directly into the reactor and compounds, and B) a second step of converting the char and pyrolysis gas, coming from the solar microwave reactor, primarily into CO and H2, by chemical oxidation-reduction reactions occurring in a cyclone reactor, in which said cyclone reactor enables the formation of a gaseous vortex driving and oxidizing the char particles, owing to the combustion of the pyrolysis gases or additional gas, the injection of heated gas or gas mixtures into the cyclone reactor, and the direct heating of the gases present in said reactor by microwaves injected directly into the cyclone reactor.

The gases used to produce the oxidation-reduction reactions are heated, accelerated and pressurized under the synergistic action of thermal energy resulting from the heating of the walls of a pressurization and acceleration heating reactor, by convergence and/or reflection of solar radiation at the surface of the walls of said reactor, and by microwaves injected into said reactor.

The cyclone reactors and/or the pressurization and acceleration heating reactors include means for producing gaseous plasmas and mixed gas/particle plasmas or plasmons.

Microwaves can be used at the same time as infrared radiation, preferably at frequencies corresponding to the absorption frequencies of the modes of asymmetric vibration of CO2 molecules.

The gasification substrate can include heterogeneous particles comprising particles of compounds containing carbon, and additive particles promoting gasification, optionally agglomerated or mixed with the particles of the carbon-containing compounds.

The additive particles can include reduction metals that promote gasification by oxidation-reduction reactions and the production of charged elements and free radicals by electric arcs produced by currents created in the particles, but also silica and/or silicon particles producing SiO capable of binding a portion of the carbon contained in the compounds in the form of SiC.

The implementation of the process involves a solar microwave torrefaction pyrolysis reactor and a cyclone reactor:

The solar microwave torrefaction pyrolysis reactor comprises, inter alia:
  a pipe, for example made of a refractory material,
  means for moving the compounds inside the pipe of the solar microwave torrefaction pyrolysis reactor,
  means for concentrating and causing convergence of solar radiation at the surface of the pipe of the reactor,
  means for insulating the pipe of the reactor from the external environment, means for improving the thermal inertia of the pipe of the reactor, means for producing microwaves, means for guiding microwaves.

The cyclone reactor comprises, inter alia:

at least two cyclone units superimposed or nested and communicating with one another, devices enabling combustion creating gas vortices in the units, devices for lateral or tangential injection of gas into the units, creating gas vortices, means for producing and guiding microwaves.

The implementation of the process also involves, inter alia:

an oxidation gas pressurization and acceleration heating reactor comprising:

a pipe, for example made of a refractory material, means for concentrating and causing convergence of solar radiation at the surface of the pipe of the reactor, means for insulating the pipe of the reactor from the external environment, means for improving the thermal inertia of the pipe of the reactor, means for moving the gases as optionally the particles along the pipe of the reactor, by compressing them, heating them and accelerating them such as (but not limited to) blade rotors, centrifugal compressors, turbines, at least one annular chamber, and at least one microwave source optionally complemented by an infrared source, induced or non-induced electric current, optical and microwave devices for producing gaseous plasmas and/or mixed gas/particle plasmons, at least one magnetron and at least one waveguide for producing microwaves between 1 GHz and 300 GHz and guiding said microwaves.

DETAILED DESCRIPTION 1.1 In one embodiment, the functional unit enabling torrefaction and pyrolysis of the substrate is a solar/microwave oven reactor (F_smo) consisting of a pipe (FIG. 1.1) with a diameter of between 1 centimeter and 5 meters and a length of between 10 centimeters and 10 meters. The pipe will be, for example, made of a refractory material such as (but not limited to) carbon covered with ceramic, ceramic, tungsten steel, titanium, nickel and so on.

Figure 1:
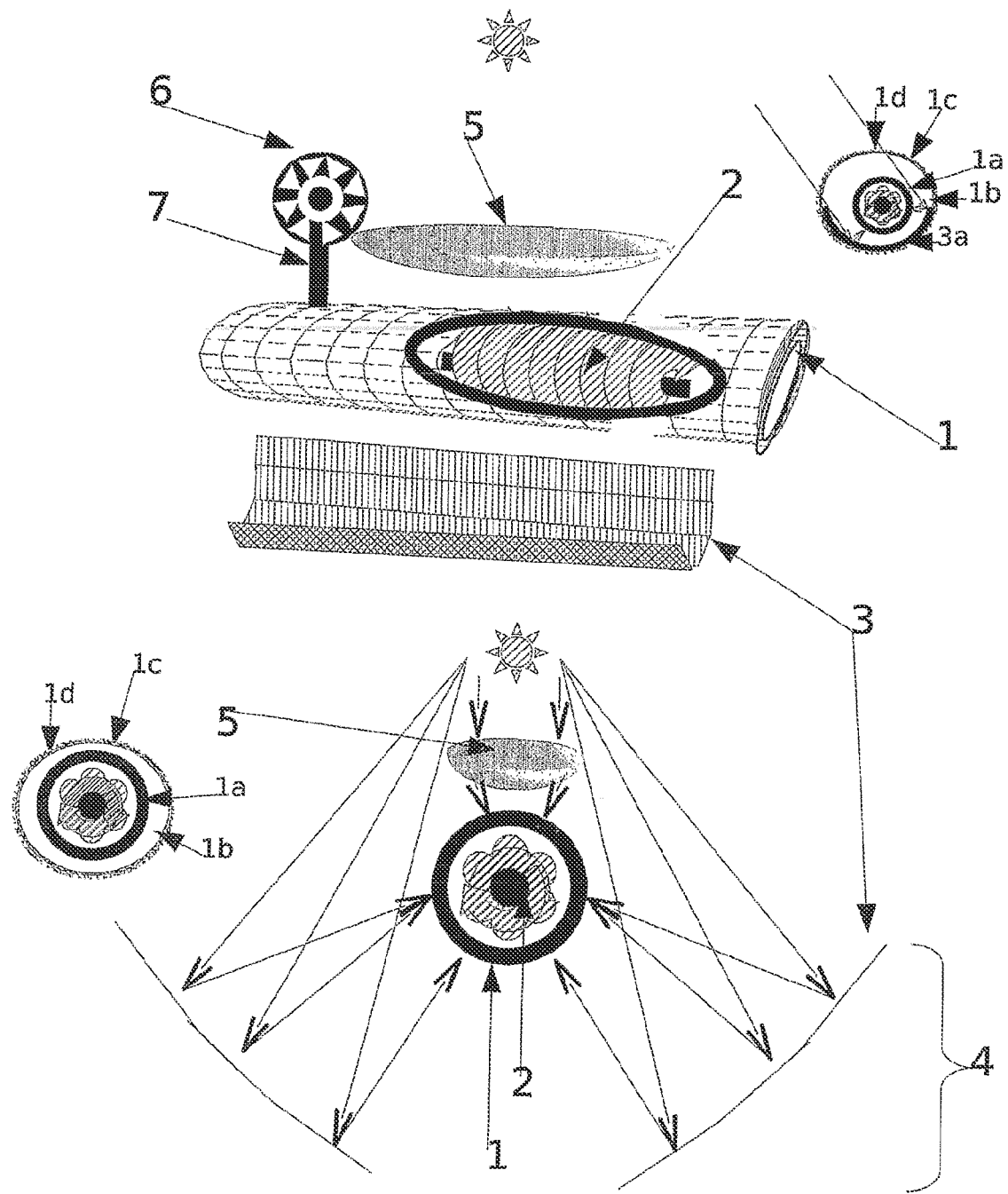
FIG. 1 shows a functional unit for heating and pyrolysis of a substrate.

At the center of the pipe, a worm screw (FIG. 1.2) is provided, enabling the biomass or the coal to move through the opening of the pipe. The substrate may be organized in homogeneous or non-homogeneous granules or particles with a size between several millimeters to several centimeters. In this document, granules and particles will be referred to as granules. Outside the pipe at a constant distance, along the length thereof, one or more mirrors or solar concentrators are provided, for example aluminum (FIG. 1.3), enabling the light of the sun to converge at the surface of the pipe. The pipe will preferably be a matt black color enabling maximum absorption of the light and heat of the solar radiation. The paint on the pipe may comprise silica particles several microns in diameter (quantum particle or Qdot) optimizing the absorption of the UV radiation. In general, the outer coating of the pipe may be covered or consist of materials enabling maximum absorption of heat and light, such as those developed for solar water heaters. In certain embodiments, the mirrors are, for example, concave or ellipsoid mirrors with respect to the main axis of the worm screw pipe, so that the radius of curvature is equal to the distance separating the mirrors from the surface of the worm screw pipe. In another embodiment, the mirrors may be mirrors with a low rectangular width, arranged parallel to the axis of the worm screw pipe according to the lengths thereof, at a constant distance from the surface of the pipe. The distance between the mirrors and the surface of the pipe will be defined so that the width of the image or the reflection of the mirror on the surface of the worm screw pipe is less than the diameter of the pipe, so that all of the light reflected by a mirror reaches the surface of the pipe. In a cross-section of the worm screw pipe, a series of mirrors will be provided so that the width of the mirrors enables a semicircle or any ellipsoid section around the pipe to be formed in a staircase arrangement (FIG. 1.4). In the case of perfectly planar mirrors, it is sufficient to provide mirrors of which the width is less than the diameter of the worm screw pipe. Each mirror will have a more or less significant tilt with respect to the tangent to the circular or ellipsoid support at the level of attachment of the mirror, so as to enable the reflection of all of the light at the surface of the worm screw pipe.

Any intermediate situation involving multiple rectangular concave mirrors in a cross-section of the worm screw pipe can be envisaged. The distance between the mirrors and the surface of the worm screw is defined by the radius of curvature of the mirrors. This distance can optionally be shorted so that the width of the image of the mirror on the worm screw pipe is between one point (a line along the pipe) and the size of the diameter of the worm screw pipe. The support of the mirrors, in a circle or an ellipsoid portion, will pivot around the worm screw pipe so as to provide the best reflection of light on the surface of the pipe. Similarly, each mirror will optionally have a suitable pin enabling it to pivot with respect to the tangent of the support, so as to provide the best angle of reflection with respect to the position of the sun. All of the movements of the mirror supports or of the mirrors themselves may optionally be produced by a computer-controlled drive system. The best orientation will be determined by visual receptor cells arranged on the worm screw pipe.

The worm screw pipes will preferably be directed lengthwise toward the south for maximum sun exposure. An area of the mirrors located precisely in line with the worm screw pipe will never be illuminated. The mirrors in the shaded area will optionally be removed. The position of the shaded area may vary from one orientation to another of the worm screw pipe, and adjustments are made according to the orientation. In the line of the shaded area above the worm screw pipe, convergent or Fresnel lenses are provided (FIG. 1.5) at a distance from the surface of the worm screw pipe near the focal distance thereof. The number of lenses will depend on the size and the diameter of the worm screw pipe. The lenses will be arranged on a support of which the orientation movements are integral with the rotations of the mirror holder on the other side of the worm screw pipe.

At different points of the worm screw pipe, microwaves with a frequency of between 1 GHz and 300 GHz are introduced. The number of microwave sources, between one and several dozen, will depend on the desired power and the electrical consumption envisaged for the installation. In certain embodiments, these microwave sources will consist of a solenoid surrounding the worm screw pipe connected to a high-frequency electric current generator. Under the action of the alternating current, the solenoid generates radiofrequencies in the worm screw pipe.

In a preferred embodiment, the microwave source is a magnetron (FIG. 1.6). The portion of the worm screw opposite the antenna of the magnetron or the waveguide is optionally made of a material insensitive or transparent to microwaves and electrically neutral, typically ceramic. The width of the pipe will preferably be equal to an integer with a wavelength "λ" of the microwaves used. This width may be modulated according to the dephasing "φ" due to the reflections on the walls. The region of the pipe where the waves produced by the magnetron antenna are introduced is optionally covered on the internal face with a material capable of reflecting the microwaves, typically an aluminum sheet deposited on a ceramic coating (any other material reflecting microwaves may be suitable). The covered area of the reflector extends on either side of the region where the microwaves are introduced, preferably with a length equal to λ/4 so as to promote constructive interferences. In a preferred embodiment, the material comprising the worm screw pipe will reflect microwaves.

The microwaves cause very fast heating of the molecules of the gasification substrate, by agitating water molecules contained in the granules, or any other molecules with a dipole moment. The heat produced by the microwaves added to the heat of convergence of the solar radiation causes torrefaction and pyrolysis of the substrate. During this pyrolysis, there is a release of volatile materials containing tar as well as various other inflammable gases. These different gases are collected by degassing pipes (FIG. 2.8) so as to be injected into a gasification reactor. Before they are injected into the gasifier, these gases can be superheated (between 160 and 2000° C.) by supplying microwaves with a magnetron or another microwave source.

1.2 In certain embodiments, the reactor pipe (FIG. 1.1a) will be contained in a transparent vacuum confinement chamber (FIG. 1.1c) enabling heat losses with the external environment to be limited.

In certain embodiments, the space (FIG. 1.1b) between the confinement chamber and the pipe will be filled with a gas limiting heat loss with the external environment. It may be xenon, krypton or argon, or any other gas or mixture of gases enabling the heat loss between the surface of the reactor pipe and the external environment to be limited. In a preferred embodiment, the vacuum chamber will be a pipe made of glass or any other transparent material containing the reactor pipe. The wall or the surface (FIG. 1.1d) of the pipe may contain fluorescent quantum particles (quartz particles) which will convert the ultraviolet sunlight into visible or infrared light, thus enabling it to efficiently cross the wall of the confinement chamber.

In certain embodiments, the internal face of the wall will include a reflective portion (FIG. 1.3a) enabling the light to be reflected at the surface of the reactor pipe.

Figure 11:
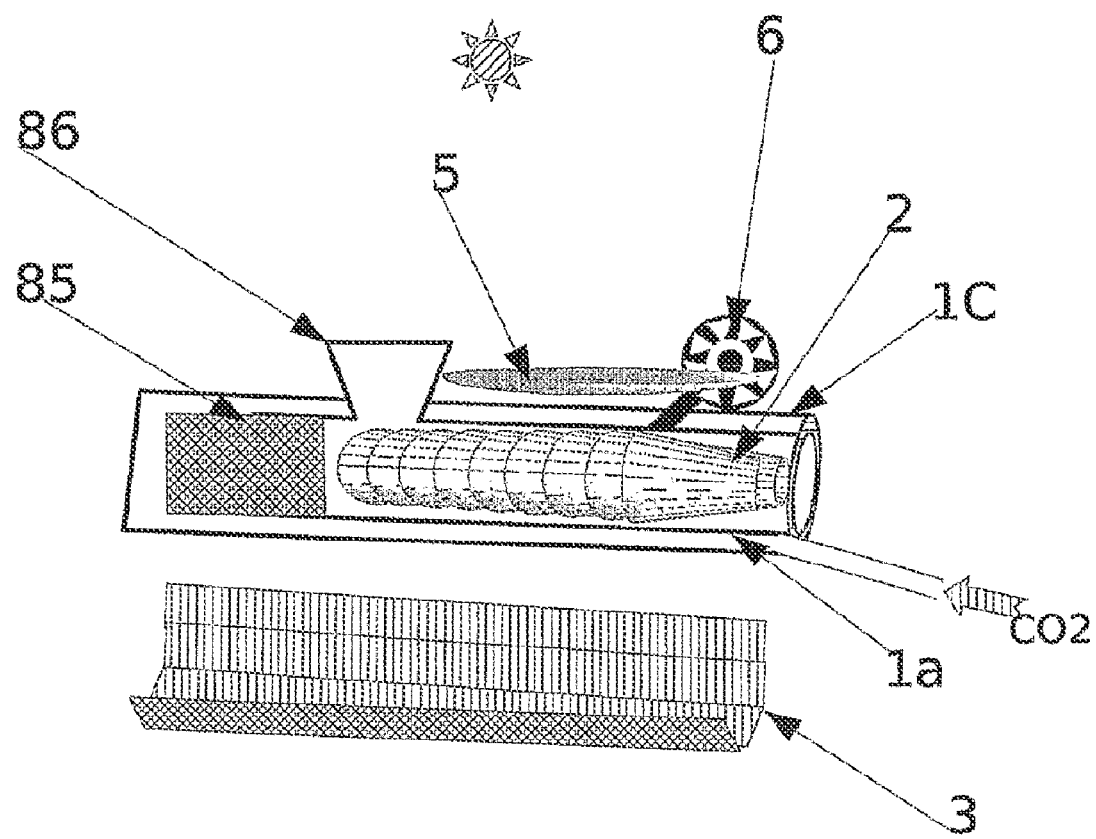
FIG. 11 shows a functional unit for roasting and pyrolysis of a substrate.

1.3 In a preferred embodiment, an end of the reactor pipe (FIG. 11.1a) F_smo opens into the transparent confinement chamber (FIG. 11.1c) so that the gas limiting heat losses can penetrate the interior of the reactor pipe.

The end of the F_smo reactor pipe in question will however be closed by a porous body (FIG. 11.85) requiring numerous contacts between the gas penetrating the F_smo reactor pipe and the mesh of the porous body.

The porous body, preferably made of ceramic, has a large exchange surface and will act as a solar radiation absorber improving the thermal inertia of the F_smo reactor. The porous body will for example be a honeycomb-type multi-channel monolith, for example, made of cordierite or a porous ceramic foam made of silicon carbide SiC. The porous body will, for example, be covered or will contain $M_xO_y$ oxides with M preferably chosen from Al, Si, Mn, Fe, Co, Ni, Cu, Zn, Ti or Zr. The oxides present at the surface or in the porous body, in addition to heating the gas, will optionally catalyze the reduction of the gas passing through the porous body, for example $CO2$ into CO or $H2O$ into $O2$ and $H2$, if $CO2$ or $H2O$ is used as the gas for limiting heat losses. In this embodiment, greenhouse gases such as $CO2$, $NH4$ or $H2O$ will be preferred as gases limiting heat losses. The gas limiting heat losses is injected into the confinement chamber opposite the opening of the reactor pipe. The gas then circulates in the transparent confinement chamber insulating the wall of the F_smo reactor pipe from that of the transparent confinement chamber. In this way, the gas captures the infrared radiation coming from the wall of the F_smo reactor pipe heated by the solar radiation and internally by the microwaves, heating itself as it travels to the inlet of the reactor pipe. The gas then rushes through the porous body where it is further heated in contact with the porous structure. Under the action of any oxides present in the porous body, the gas may be reduced. The gas or its reduced form then penetrates the portion of the reactor pipe containing the substrate and the worm screw, where it contributes to the pyrolysis and torrefaction of the substrate.

1.4 In a specific embodiment, the solar/microwave furnace reactor (F_smo) can provide the energy necessary for other types of industrial reactions such as alcohol fermentation from water sweetened with sugarcane juice, or ground sugarcane material, but also enzymatic digestion reactions necessary for the production of sugar and alcohol from beetroot, corn, bananas, and so on.

The system is then adjusted to reach lower temperatures (30 to 40° C.) enabling enzymatic reactions during the transition of substrates in the reactor pipe under the action of the worm screw. The substrate is heated from the beginning by microwaves and the convergence of light at the surface of the reaction pipe. The enzymes necessary for fermentation, digestion and isomerization are introduced according to the desired order of reactions, after the microwave source, by ferment inlets.

In general, the F_smo reactor can be used in all synthesis, lysis or phase changing chemical or physicochemical reactions of one or more products or substrates requiring input heat in order to trigger and/or maintain the reactions, in particular saponification or esterification reactions.

2.1 After pyrolysis, the char or the coal is emptied into a gasifier. Any type of gasifier may be suitable. The preferred embodiment will use a mixed fixed bed/fluidized cyclone bed gasifier (FBCB) or more generally a cyclone reactor.

Figure 2:
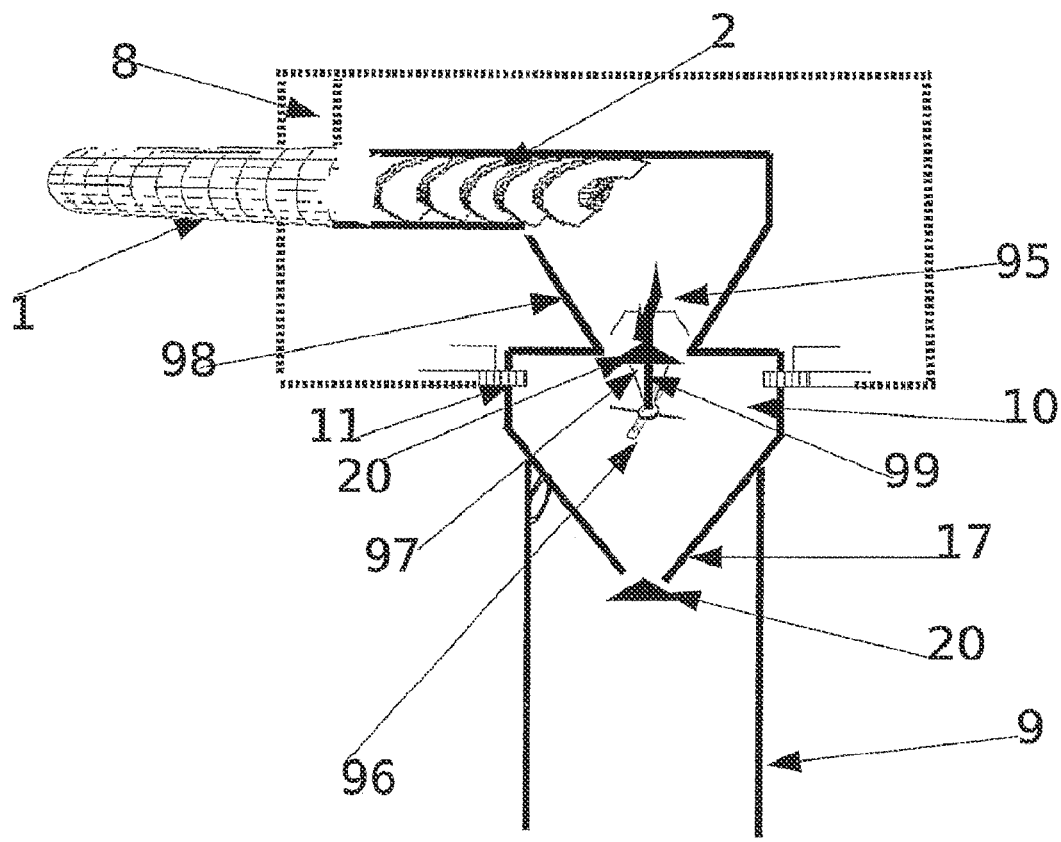
FIG. 2 shows a gasifier and a cyclone combustion chamber.
Figure 2:
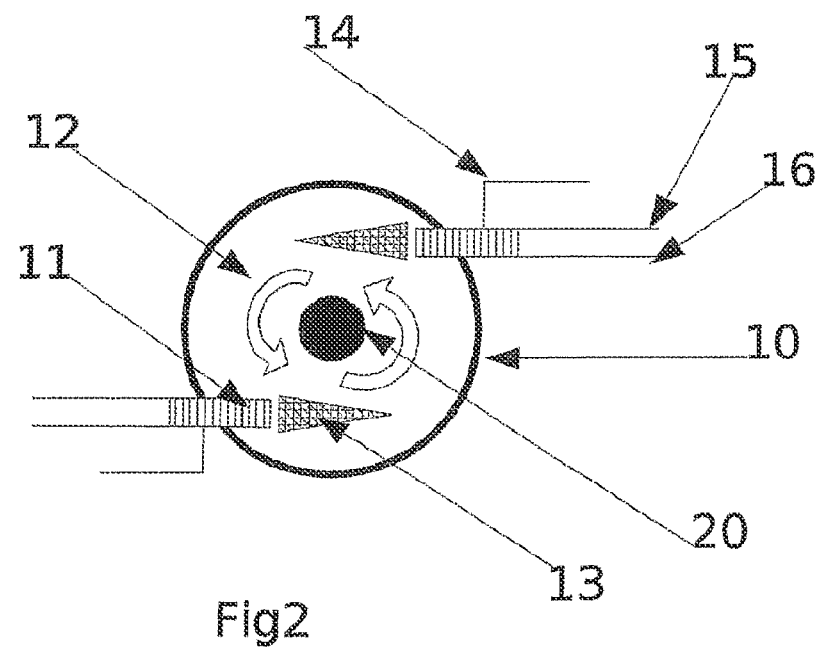

In a specific embodiment, the FBCB is comprised of a core consisting of a pipe with an average diameter of between 10 centimeters and 5 meters (FIG. 2.9). The core may be made of refractory stainless steel, titanium, zirconium, nickel, ceramic, tungsten steel or any other material capable of withstanding temperatures above 800° C. The substrate is emptied by a worm screw (FIG. 2.2) into a cyclone combustion chamber (FIG. 2.10) mounted on the core of the reactor through a collection chamber (FIG. 2.98).

The combustion chamber enables the gases from the pyrolysis phase optionally combined with additional combustion gases such as methane to be burned. The gases are, for example, burned by two burners (FIG. 2.11) placed tangentially to the combustion chamber, so that the flames (FIG. 2.13) cause the combustion gases (essentially CO2 and H2O) to eddy (FIG. 2.12), forming a descending gas vortex in the cyclone and a rising gas column in the cyclone.

The inlet of the combustion chamber is partially obstructed by a cone structure (FIG. 2.20) so that the lower face of the cone is equipped with channels (or blades) having an orientation similar to the direction of rotation of the gaseous vortex of the combustion chamber, thus enabling the gases of the rising column to be reoriented toward the gaseous vortex.

The upper face of the cone includes channels that form, with the upper edge of the combustion chamber, inlets so that the substrate emptied from the worm screw can enter the combustion chamber. The inlets of the combustion chamber are oriented in the direction of rotation of the vortex of the combustion chamber.

A pin (FIG. 2.99) passes through the conical structure by the apex so that the latter can be moved in rotation. The pin will be equipped on the side of the cyclone combustion chamber with a heat shield (FIG. 2.97) protecting it from heating due to the rising gas. In the combustion chamber, an impeller (FIG. 2.96) is attached to the pin so as to cause the integral pin-impeller assembly to rotate under the action of the rising gas column. At the other end of the pin, in the chamber that receives the substrate, a blade (FIG. 2.95) integral with the pin so that by rotating, the blade grinds the substrate granulates emptied by the worm screw through the collection chamber. The ground material is then suctioned into the combustion chamber, through conduits of the upper face of the cone structure, owing to a Bernoulli effect, caused by the flow of the rising gas column, on the lower face of the cone structure, when the rising gases of the cyclone are redirected toward the descending rotating vortex. In certain embodiments, the structure closing the top of the cyclone chamber is an inverted cone, equipped with blades, of which the edge is curved toward the cyclone combustion chamber, thus enabling the rising gas column to be reoriented toward the combustion chamber.

The gaseous mixture burned in the combustion chamber (pyrolysis gas, air, additional gas) can optionally be produced directly in the combustion chamber owing to three independent pipes (FIGS. 2.14, 2.15, 2.16) supplying a nozzle burner. Each pipe diffuses one of the three gases at the desired pressure and speed, and the firing of the burner is triggered by a spark (or electric arc) source arranged near it. The combustion performance is controlled by the gas flow rate of each pipe.

However, any type of mixer, regulator, carburetor, optionally associated with gas flow meters, can be used to supply the burners. Different types of burners can also be suitable. The pressurization of the injected gases can be obtained by turbochargers combining a turbine with a pup; the pump compresses the gases under the action of the turbine, operated by water vapor or by the expansion of another gas or by any other gas pressurization process.

The volume of the reactor core is segmented by a series of skirts (FIGS. 2.17 and 3.18-3.19). Each skirt consists of a pierced cone facing downward, narrowing the opening of the reactor from the wall of the core. These skirts perform two roles. They limit the compression of the column of granules, and they create vortex areas to promote either the reaction:

$$C+H2O \leftrightarrow CO+H2 \qquad r1,$$

or the reaction:

$$CO2+C \leftrightarrow 2CO \qquad r2,$$

Figure 3:
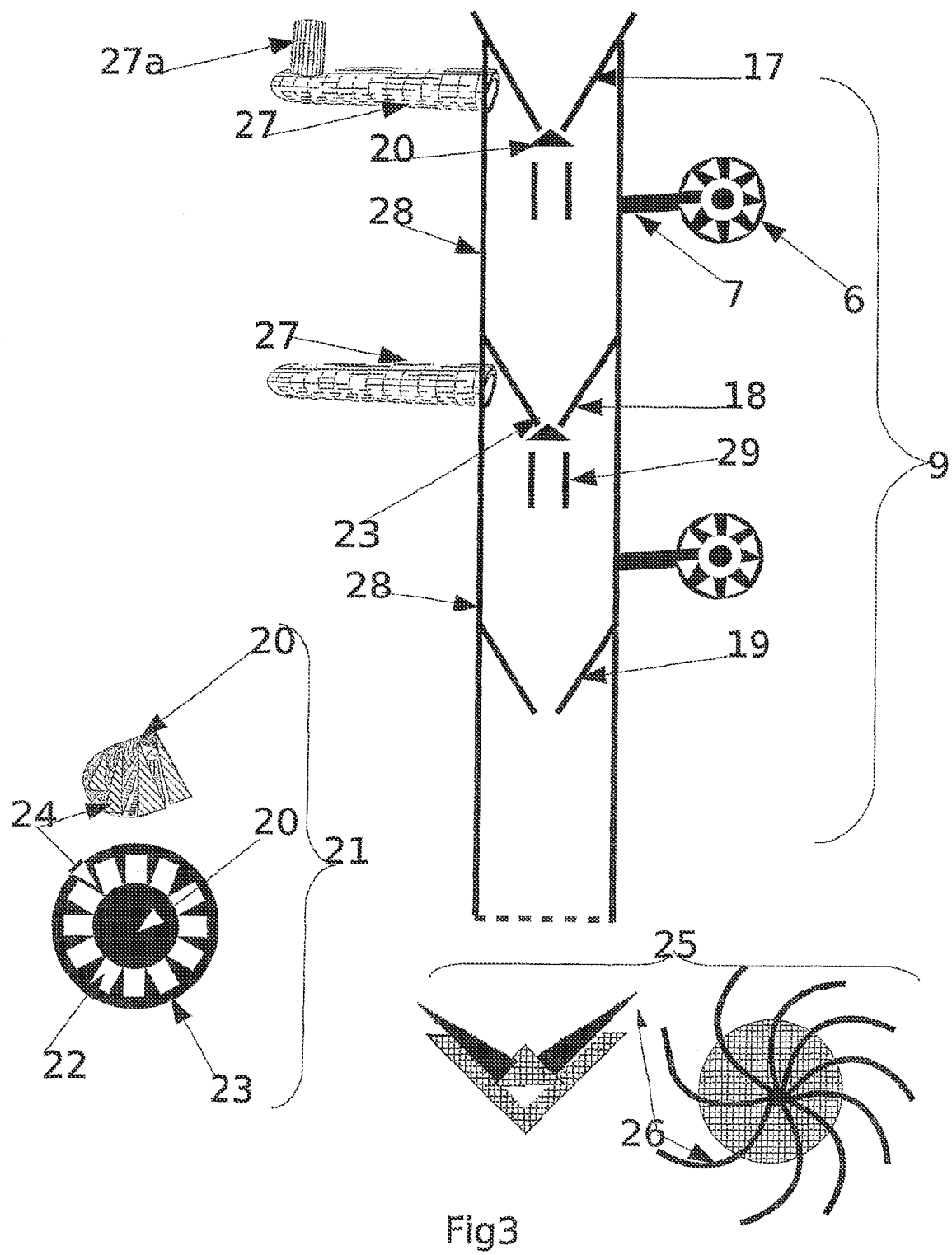
FIGS. 3 to 8 show gasifiers and elements thereof.

The circular circulation of gases, driving the torrefied granules, enables longer capturing of these granules in the different cyclones created in the FBCB by the series of skirts. An abrasive body, such as sand, stacked pumice or any other abrasive material can be mixed with the char injected into the cyclones so as to exert abrasion or erosion on the char particles owing to the eddying movement of the gases as well as greater thermal inertia. The sand or the abrasive material will also enable the molten material to be absorbed (metals still present in the char), thus preventing the pores and channels or grooves of the system from becoming clogged. A first skirt is placed after the combustion chamber 17. Several centimeters below the central opening of the skirt, a cone structure 20 is arranged so as to partially obstruct 21 the opening of the funnel formed by the skirt. A series of conduits 22 are created between the edge of the skirt 23 and the cone structure 20 by a set of blades 24, so that it is necessary to pass through one of said conduits in order to pass the orifice of the skirt. The size of this conduit will be sufficient to enable the torrefied granules to pass. The conduits are arranged regularly according to a rotation of a constant angle around the apex of the cone obstructing the skirt. The conduits will optionally be curved or oblique and oriented so that, by traveling through them, the granules and gases will be projected tangentially to the wall of the reactor in a rotation movement in the same direction as the rotation imparted on the combustion gas by the burners The lower face of the cone 25 is equipped with channels (or blades) 26 with an orientation similar to that of the conduits. In the combustion chamber, the combustion gases, at a temperature above 800° C. and moved in rotation, will attack the torrefied granules, which are emptied from the worm screw. Some of the granules will be oxidized according to reactions r1 and r2, and will be driven by the gases in a circular movement through conduits of the orifice of the skirt. Below the first skirt, at a distance of between 10 and 500 centimeters (preferably 50 centimeters), a second skirt (FIG. 3.18) is arranged with the same cone and conduit device as described above, and partially obstructs the opening of the skirt. CO2 or a mixture of H2O/CO2, pressurized at a temperature above 800° C., typically 1500° C., is then injected into the top portion of the space defined by the two skirts, tangentially to the wall of the reactor (FIG. 3.27), in the direction of rotation pulsed by the burners. The space defined by the two skirts represents a cyclone with a double axial and tangential inlet (FIG. 3.28). In a preferred embodiment, there will be five times more CO2 than H2O in the gas mixture injected tangentially.

In certain embodiments, below the area of tangential introduction of the gas mixture, at least one magnetron 6, 7 (or any other radiofrequency source) pulses microwaves into the reactor between the two skirts. The microwaves enable the injected gas mixture activating the reaction r2 and r1 to be heated and increase the speed of the gas and granule vortex. When the granules arrive at the level of the second skirt, they are driven with some of the gases through conduits of the orifice of the skirt, and the remainder of the gases separated from most of the particles rises according to the center of the reactor core, in a rising flow, to the lower face of the upper cone partially obstructing the orifice of the first skirt. A cylinder is optionally arranged at the center of the reactor (FIG. 3.29) in the first quarter of the space defined by the two skirts, so as to guide the rising gas flows toward the lower face of the cone of the upper skirt. The channels etched on the lower face of the cone impart a rotation movement on the rising flow and redirect them toward the descending rotating gases of the vortex with the same direction of rotation.

In a certain embodiment, below the second skirt, a third skirt, partially obstructed by a cone, is arranged so as to form a new cyclone/microwave unit. Water vapor pressurized at a temperature above 800° C., typically 1500° C., is then injected into the top portion of the space defined by the second and third skirts, tangentially to the wall of the reactor, in the direction of rotation pulsed by the burners and the cyclone above. Below the region of injection of the water vapor, at least one magnetron (or another radiofrequency source) pulses microwaves into the cyclone, enabling superheating of the H2O strongly activating the reaction r1 (five times faster than the reaction r2 at the same temperature).

The skirts can optionally be connected to one or more ultrasound sources thus enabling ultrasound to be injected into the reactor so as to break the H2O and CO2 gas-depleted envelopes that form around the granules and that slow the gasification reactions. The ultrasound also enables the granules to be fragmented during gasification and made more accessible. The skirts can optionally be connected to a vibration source so as to facilitate the passage of granules through the conduits.

Figure 12:
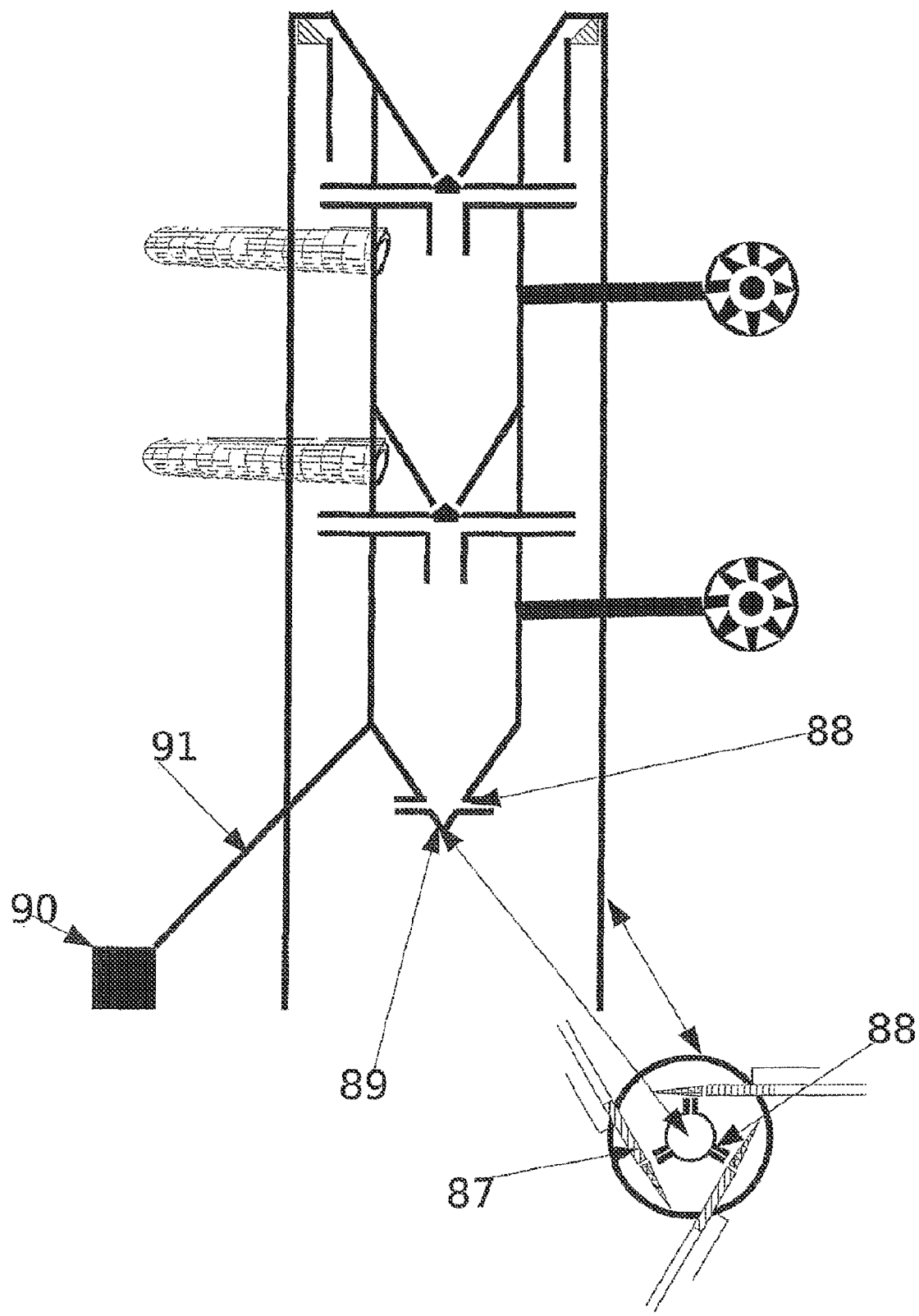
FIG. 12 shows a gasifier.

In certain embodiments, ultrasound with a frequency of between 1 kHz and 20 MHz will be introduced at the junction between the skirt and the pipe of the reactor core (FIGS. 12.90 and 12.91). The ultrasound will enable the formation of sprays resulting from the explosion of cavities in liquids such as the tar balls present on the walls of the cyclone and will help to reduce these tar balls.

The cyclone/microwave units, defined by two skirts, can be repeated many times in the FBCB with injections of CO2, CO2/H2O or H2O in any order. This structure forms a network of superimposed cyclones.

An additional gas such as methane can be injected tangentially into the cyclones. The methane will be oxidized by water and the CO2 into CO with the production of H2 according to the following reactions:

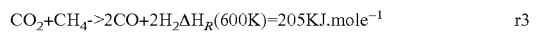

$$CO_2+CH_4 \rightarrow 2CO+2H_2 \Delta H_R(600K)=205KJ.mole^{-1} \qquad r3$$

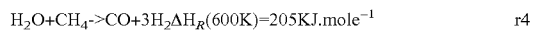

$$H_2O+CH_4 \rightarrow CO+3H_2 \Delta H_R(600K)=205KJ.mole^{-1} \qquad r4$$

The release of H2 in the reactor slows the reaction r1, thereby promoting the reaction r2, and therefore the consumption of CO2, and improves the pollution balance of the system.

The region of the core of the gasification reactor receiving the microwaves may optionally be covered with a material reflecting microwaves, typically aluminum on a ceramic support. Preferably, the core of the reactor is made of a material reflecting microwaves, and it can have a diameter equal to an integer with a wavelength "λ" of the microwaves used. This width may be modulated according to the dephasing "φ" due to the reflections on the walls.

Figure 4:
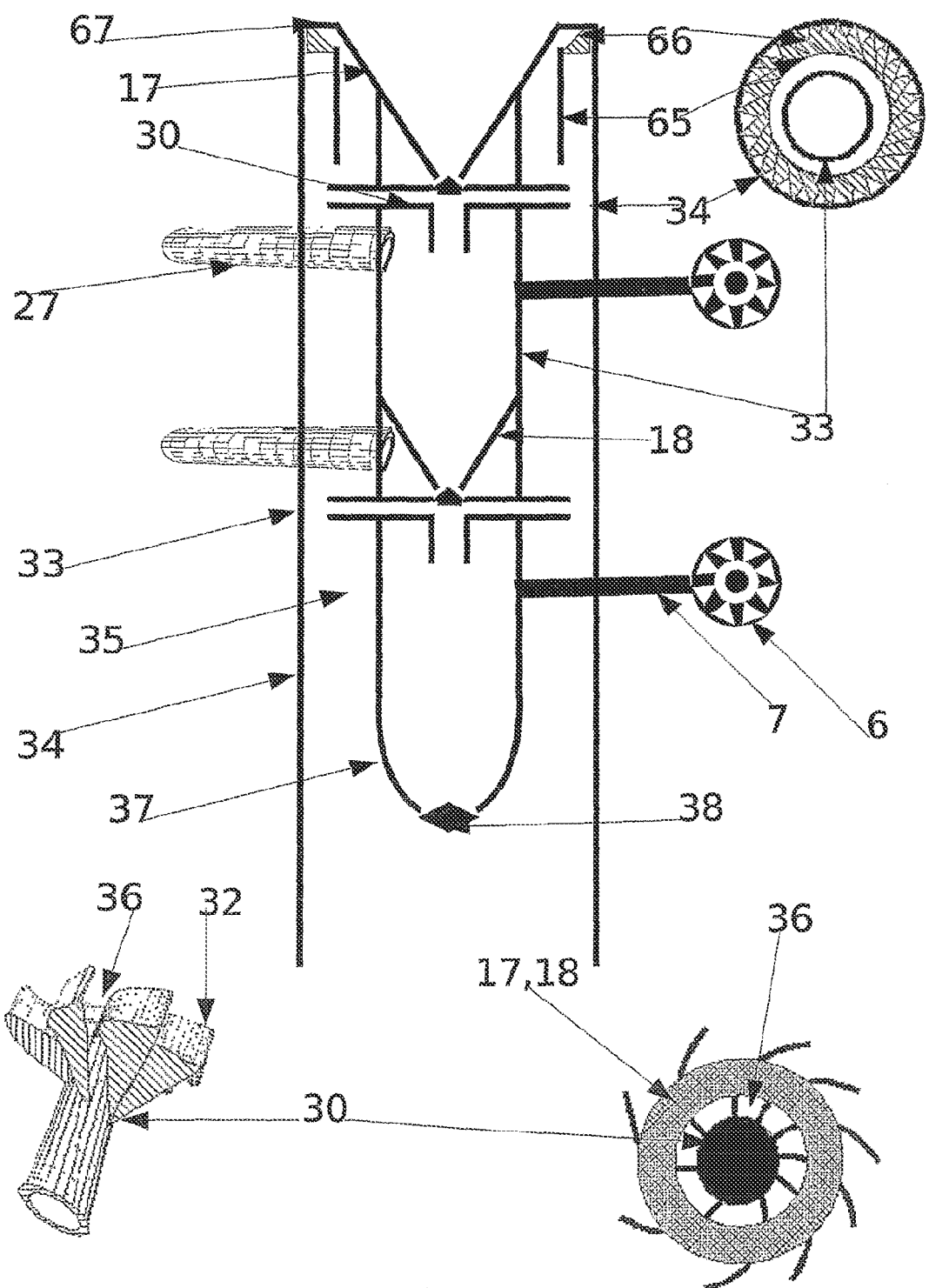

2.2 In another embodiment, the core of the reactor will consist of two pipes nested together to form a double-core FBCB (FBCB_dc). The inner pipe of the core will include the cyclone/microwave units described above in section 2.1. The cyclones are modified so that the cone partially obstructing the opening of the skirts and the rising flow pipe at the center of the cyclone are joined to form a hollow T-structure (FIG. 4.30), enabling the rising flows of the cyclone to be rejected outside the cyclone in the outer pipe of the core. The base of the T consists of the rising flow pipe (FIG. 4.31). The junction between the base of the T and the horizontal bar consists of the cone. The horizontal bar of the T represents the gas outlet nozzles (FIG. 4.32), connecting, by a hollow pipe, the cone with the space located between the inner pipe (FIG. 4.33) and the outer pipe (FIG. 4.34) of the core of the reactor. We will call the hollow horizontal structure identified as the bar of the T the "horizontal nozzle" (FIG. 4.32). The horizontal nozzle therefore enables the rising flows of the cyclone to pass through the central pipe, toward the space between the two pipes nested together, which we will call the inter-pipe space (FIG. 4.35). The T-structure can be made more complex by duplicating the horizontal nozzles by rotation in the same plane, perpendicularly to the rising flow pipe of the cyclone. The portion of the horizontal nozzles located between the cone and the edge of the skirts is profiled in the form of a blade, and all of the blades are oriented in the same direction so as to create a system of oblique conduits for allowing gases and particles to enter the cyclone located below (FIG. 4.36). The orientation of the blades will be defined so as to impart a rotation in the same direction as the rotation caused by the burners in the combustion chamber (it will preferably be the direction induced by the Coriolis force).

Intermediate blades can be added to the "pipe blade" structure so as to optimize the size of the conduits without having to increase the number of nozzles. The horizontal nozzles will be curved in the direction of general rotation of the gases in the reactors, or arranged obliquely, to enable gases to enter more or less tangentially to the wall of the outer pipe of the FBCB_dc core. The outlet of the nozzles will be directed slightly downward and will arrive near the wall of the outer pipe. Due to the orientation of the horizontal nozzles, the inlet of gases in the inter-pipe space will cause, in this space, a downward gas rotation movement, forming a descending vortex rotating in the same direction as the movement induced in the combustion chamber.

In the lower portion of the FBCB_dc, the outer pipe will be longer than the inner pipe by a length of between 10 centimeters and 5 meters, and preferably a length of 100 centimeters. The outer pipe will form, at its end, an open cone. The cone will, for example, be formed over a distance of 50 centimeters for an end of 100 centimeters. These distances are merely provided for indicative purposes, and many conformations are possible. The opening of the cone will have a diameter between the diameter of the inner pipe +30% and the diameter of the orifices of the skirts of the cyclones of the inner pipe. The outer pipe of the core of the FBCB_dc therefore forms a cyclone containing the inner pipe at the level of the rising flow of the outer pipe. The lower end of the inner pipe of the core will end with a skirt having a round curvature (FIG. 4.37) and an orifice with a partial closure having a specific shape. The closure will consist of two cones having different sizes or the same size (FIG. 4.38) opposite one another and fastened by their base (bi-cone). If the sizes are different, the smaller cone will partially obstruct the orifice of the skirt, while the larger cone will serve as a protective cap in the extension of the round curvature of the skirt. The bi-cone structure will, for example, be attached by the pointed end of the small cone to a support arranged through the orifice of the skirt. The entirety or a portion of the bi-cone may optionally rotate about the axis defined by the line passing through the two apexes. Preferably, only the larger cone (in the extension of the round curvature) will rotate about the axis. The conical face of the cone in the extension of the round curvature will optionally be equipped with patterns (blades and/or channels) requiring it to rotate under the action of the rising flow of the outer pipe. The central flow of the cyclone of the outer pipe of the core will be separated and accelerated by the cone. The vacuum created by the separation and acceleration will suction the torrefied granules leaving the last cyclone of the inner pipe of the core, and will drive them over a substantial distance. The mobile portion of the bi-cone structure will rotate under the action of the flow enabling a more effective expulsion of the granules. The presence of the bi-cone will prevent particles from flowing backward into the last cyclone of the inner pipe. The gasification of granules will occur in the outer pipe of the reactor core, either in the dynamic phase in the different flows of the cyclone of the outer pipe, or in the static phase in the fixed bed after accumulation at the base of the outer pipe.

All of the elements passing through the inter-pipe space:
pipes supplying the cyclones of the inner pipe of the reactor core with $CO_2$, $H_2O$ and other gases,
waveguides pulsing the microwaves into the cyclones (when magnetrons are used as a microwave source),
outlets of the outlet nozzles of the cyclones of the inner pipe,
will be profiled aerodynamically so as not to disrupt the flow of the gases. In a specific embodiment, the elements in the inter-pipe space are covered with stationary profiled structures, oriented so as not to disrupt the orientation of the flows. These profiles or profiled structures are parallel to the flow of the different regions of the cyclone formed by the outer pipe of the reactor core. In a preferred embodiment, the profiled structures will be small segments capable of moving around different conduits, which will be oriented alone at best to the flows of the different regions of the cyclone of the outer pipe of the reactor core. The profiled structures will, for example, be small rectangular or trapezoid structures of which the length may vary from 0.5 centimeters to 1 meter with a cross-section in the shape of an airplane wing or a drop of falling water. Each profiled structure will comprise a hollow pivot pin parallel to the length of the rectangle or trapezoid, enabling it to be arranged on the different conduits passing through the inter-pipe space. The pivot will preferably be off-centered with respect to the center of gravity so as to enable quick and stable orientation in the different flows. In general, all of the aerodynamic profiled shapes facilitating the flows of gases or fluids will be capable of being used to form the profiled structures. All of the elements passing through the inter-pipe space may be profiled by mobile aerodynamic elements.

The horizontal gas outlet nozzles of the cyclones of the inner pipe enter the inter-pipe space equipped with mobile or stationary profiled structures. The nozzles arrive near the wall of the outer tube of the core of the reactor tangentially to any downward orientation. The distance between the outlets of the nozzles and the wall of the outer pipe is between 0 and 95% of the distance between the two pipes forming the core of the reactor. Mounted over the outlet of the nozzle, a profiled structure is attached to the wall of the outer pipe of the core of the reactor so that the leading edge of the structure is directed upward so as to orient the flow leaving the nozzle downwardly at the desired angle. The flows of gas leaving the horizontal nozzles are therefore organized as a vertex in rotating descending currents. The vortex attacks the bed of granules coming from the central pipe and deposited at the base of the outer pipe. At this level, significant gasification takes place by the attack of gases, which will deeply penetrate the bed so as to rise in a central flow driving the lightest granules.

Figure 5:
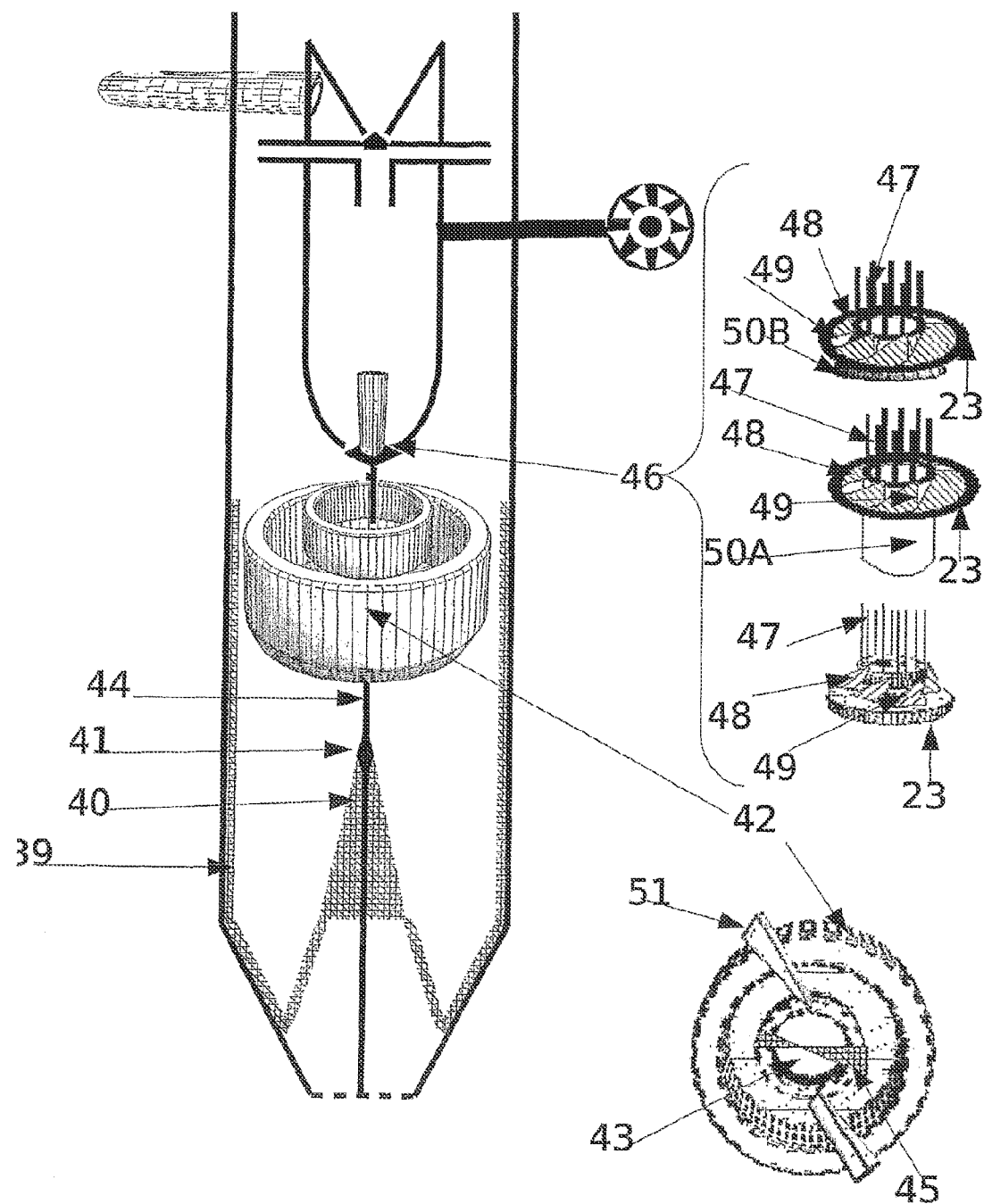

However, when the bed of granules is too large, the vortex cannot pass through the entire bed. To enable it to attack the granules deposited earlier, a screen, of which the pores are calibrated, is optionally arranged on the entire portion of the wall of the outer pipe defined by the region located between the last cyclone of the inner pipe and the base of the outer pipe (FIG. 5.39). The entire inner pipe can be screened in consideration of a loss of some of the kinetic energy of the vortex; conversely, the screened area can be reduced so as to reduce the loss of kinetic energy of the vortex.

To reduce the loss of kinetic energy of the vortex, the screen can be made of a sheet of smooth material pierced with regular holes, or it can be made so that the innermost frame at the core of the reactor (i.e. the first in contact with the vortex) is oriented in the direction of rotation of the vortex (more or less parallel to the profiled structure attached to the outer pipe, which serves to orient the rotation of the vortex).

At the level of the orifice of the cone of the outer pipe, the screen is organized as a cone rising toward the inner pipe (FIG. 5.40). The frame of the screen of the innermost cone at the core of the reactor (first in contact with the vortex) will be parallel to the main direction (length) of the outer pipe or inverted with respect to the screen of the wall of the outer pipe of the core of the reactor. The screen cone will be closed at its end, either by the screen itself or by a bi-cone part (FIG. 5.41) (cones of the same size), which is spherical, ovoid, or any shape promoting the flow of fluids.

As it arrives at the level of the torrefied granule bed, the vortex will penetrate below the bed through the screen with the finest particles (having a size smaller than the pores of the screen) and will gasify the particles of the bottom of the bed, then the vortex will form into a rising flow column around and inside the screen cone so as to rise at the center of the outer pipe of the reactor core. Some of the gas and particles will escape through the orifice of the cone of the outer pipe of the core, and will be recovered for subsequent treatments.

In certain embodiments, a portion of the outer pipe, defined by the region located between the last cyclone of the inner pipe and the base of the outer pipe, will be grooved with furrows having a width of between 50 microns and 5 millimeters and a depth of between 100 microns and 2 centimeters. In a preferred embodiment, the grooves will be 500 microns wide and 2 millimeters deep. In the cylindrical portion of the outer pipe, the grooves will be parallel to the direction of rotation of the vortex (more or less parallel to the profiled structure attached to the outer pipe so as to orient the rotation of the vortex). In the conical portion of the outer parallel pipe, the grooves will be either in two directions (parallel to the direction of rotation of the vortex and perpendicular to this direction), or absent. As for the screen, the grooves can reduce the kinetic energy of the vortex (although the local energy in the grooves will be increased by the Venturi effect). The entire inner pipe can be grooved, but to limit the energy losses, it is preferable to limit the grooved surface. In certain embodiments, the presence of grooves is combined with the screen. As for the screen, the grooves enable the vortex to pass below the particle bed; however, the particles driven are generally finer.

2.3 In certain embodiments, a rotor consisting of a basket can receive the granules that leave the last cyclone comprising the inner pipe of the gasifier. In a preferred embodiment, an annular basket (FIG. 5.42), hollow at its center (opening) (FIG. 5.43), is arranged on a pin (FIG. 5.44) joining the center of the opening at the cone of the last cyclone of the inner pipe and the base of the FBCB_dc. The pin is, for example, attached by a cross or a bar, arranged through the opening of the skirt closing the last cyclone of the inner pipe of the reactor. The basket is attached to the pin by one or more impeller(s) arranged (FIG. 5.45) between the walls of the opening of the basket, thus enabling it to rotate about the pin. Preferably, the outline of the impeller(s) will be designed so that the flow rising in the outer pipe of the FBCB_dc will cause the basket to rotate in the direction of rotation of the gas vortex in the outer pipe. The opening of the basket will optionally be covered with a screened cap in the form of a bi-cone enabling the granules leaving the cyclone to be directed from the upper stage into the basket without disrupting the rising flow.

The outlet skirt of the last cyclone of the inner pipe FBCB_dc will optionally be equipped with a blade system, forming conduits toward the inter-pipe space above the basket. These conduits are organized around a short screened cylinder (FIG. 5.46). The screened cylinder, formed by vertical metal rods arranged several millimeters from one another (FIG. 5.47) enables the formation of the rising flow in the cyclone and the filtration of the granules transported by the vortex of the cyclone and the direction thereof through the conduits (FIG. 5.48-5.49) toward the annular basket. This vertical screened cylinder system can be adapted to all of the cyclone outlets. Under the action of microwaves, currents induced in the rods will cause electric arcs catalyzing, in their vicinity, the synthesis of CO and H2. In certain embodiments, one out of two metal rods will be electrically insulated from the support, and the others will be grounded. The screened cylinder can be extended with the rising flow cylinder of the lower cyclone (FIG. 5.50a). In certain embodiments, the rising flow cylinder can be replaced by a short cone (FIG. 5.50a).

The outer edge of the annular basket may be equipped with blades having the same slope as the profiled structures arranged on the wall of the outer pipe so as to orient the vortex. The blades on the outer wall of the basket and the impellers of the opening will enable the basket to rotate at a speed close to that of the vortex. The resulting centrifugal force prevents the char or coal bed from being compressed at the base of the reactor. In certain embodiments, the blades on the outer wall will be complemented or replaced by blades having the same curvature arranged on the outer edge of the basket and directed toward the inside of the basket (FIG. 5.51). These blades will serve to rotate the basket under the action of the vortex of the inner pipe, and to redirect a portion of the flow of the vortex toward the inside of the basket for more effective gasification. The walls of the basket will, for example, be produced as a screen with calibrated pores or as a sheet of metal or any other material pierced with many calibrated holes. The outer walls of the basket will be straight, or curved outwardly or inwardly according to the speeds of rotation reached by the rotor and the power of the redirection of gases toward the inside of the basket in the different embodiments.

Figure 6:
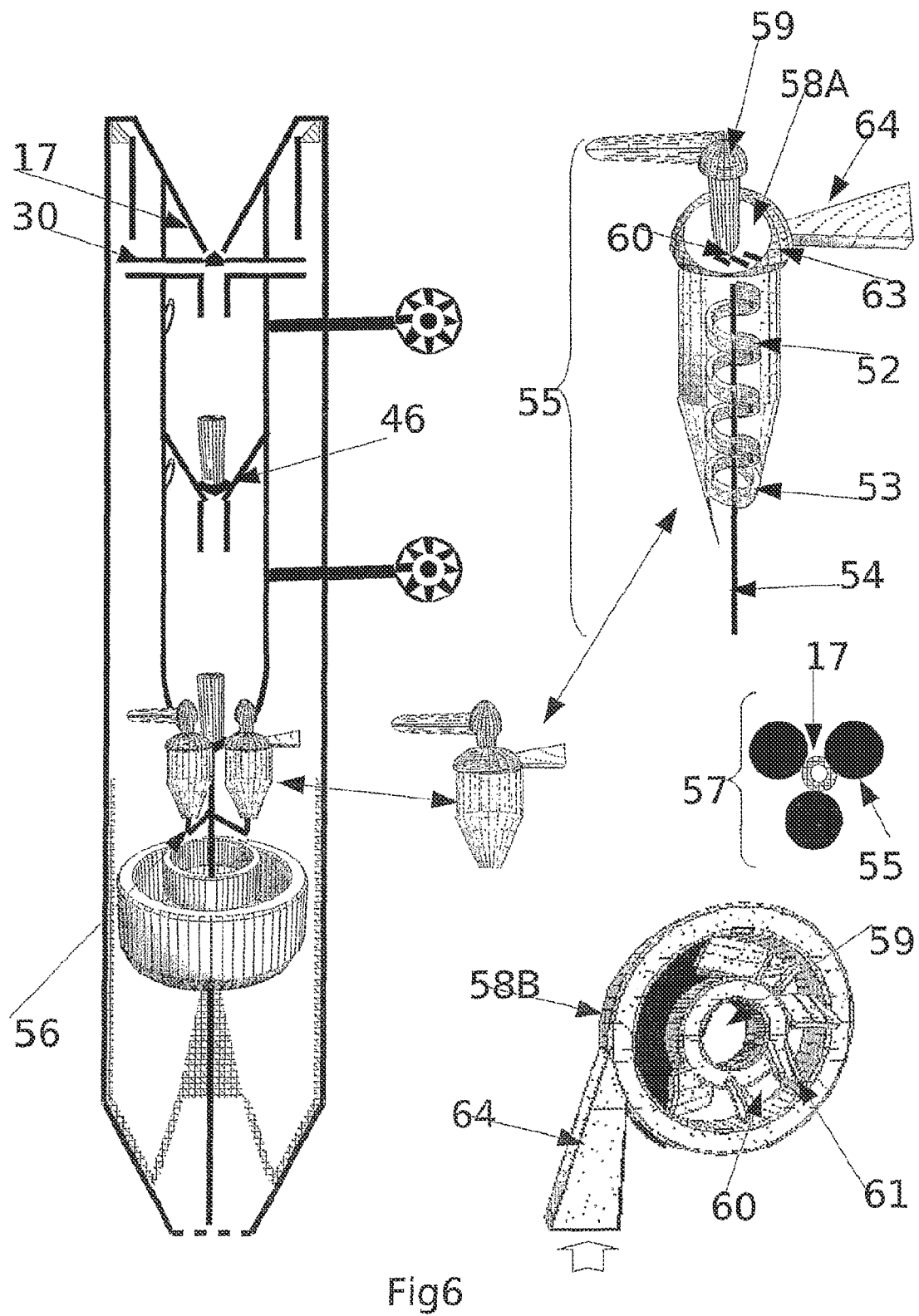

2.4 In a specific embodiment of the FBCB_dc reactor described in point 2.2, with the exception of the T-structure (FIG. 6.30) located at the level of the skirt (FIG. 6.17) closing the combustion chamber, all of the T-structures are replaced by a hollow pipe attached to the orifice of the skirts in the cyclone inside the skirt (FIG. 6.46). Optionally, the pipe is extended in the upper cyclone by a cylinder formed by vertical rods arranged several millimeters from one another (FIG. 5.47). A blade system forms conduits leading to the lower cyclone (FIGS. 5.48-5.49). These conduits are organized around the pipe and the cylinder of vertical rods. Therefore, the rising flows of the different cyclones, of the inner pipe of the core, join one another and are discharged toward the inter-pipe space by the T-structure of the skirt closing the combustion chamber. In this last configuration, by removing the bi-cone partially obstructing the last skirt of the inner pipe of the reactor core, or by replacing it with a cylinder or a hollow cone (a screened cylinder structure, FIG. 5.46), all or some of the rising flow of the cyclone formed by the outer pipe of the core joins with the rising flow of the cyclones of the inner pipe of the core. In these configurations, some of the particles leaving the different cyclones of the inner pipe will be pushed back into the cyclones, enabling longer gasification at their levels. The rising flow of the outer pipe, which does not pass through the inner pipe, will rise along the inner pipe of the reactor core. All intermediate situations in which some of the T-structures are removed are possible in order to join the rising flows of contiguous cyclones. In this type of configuration, the tangential gas supply of certain cyclones of the inner pipe can be provided with gases that circulate in the outer pipe of the reactor. For example, the cyclones, of which the T-structure is replaced by a short cylinder, can have at least one tangential gas supply pipe that opens at the level of the wall of the outer pipe of the reactor, facing the direction of rotation of the gases, so that they rush into said supply pipe. The gas supply pipe returns to the cyclone of the inner pipe in a direction tangential to the inner pipe so as to enable injection of the gases hitting the wall of the cyclone, so as to impart on the gases a rotation inside the cyclone in the same direction as the vortex of the outer pipe.

In general, the cyclones used in the gasifier have a tangential load for gases and a longitudinal load for granules and gases coming from the upper stage. The inner pipe of the reactor is therefore comprised of a series of superimposed and connected cyclones enabling the granules subjected to gasification to be transmitted to successive cyclones.

2.5 In a specific embodiment, at least one of the cyclones of the inner pipe of the reactor core will be equipped with a helical spring electrode attached to a ring electrode enabling electric arcs gliding along the helical electrode to be established (FIG. 6.52).

In a specific embodiment, the cyclone comprising the electrode will be the last cyclone of the inner pipe of the reactor core and the skirt ending it will have a cone or round shape. The walls of this cyclone will be made of an electrically insulating material. The inlet conduits for particles and gases and the inverted cone or the cylinder located at the top of the cyclone will be made of metal or an electrically conductive material. The top of the cyclone will form an electrode, which is grounded and/or connected to a negative potential. The spring electrode will be arranged near the wall of the reactor. The base of the spring ends with a ring structure so as to close the last turn on itself (FIG. 6.53). The other end of the spring is curved so as to return to the middle of the spiral of the spring, so as to form a central pin (FIG. 6.54). The spring is arranged in the conical portion of the cyclone by its end comprising the ring structure. At rest, the spring is at a distance of between 0.5 millimeters and 2 centimeters from the electrode at the top of the cyclone. The axial rod of the spring extends from the cyclone through the opening of the lower skirt. This central rod will be connected outside of the reactor to a manual or automatic system enabling the spring to be actuated by compressing it so as to shorten it or by stretching it so as to extend it. For example, the rod will be connected to another perpendicular rod made of an electrically insulating material. The perpendicular rod extends from the reactor and is, for example, connected to a servo-actuator or an electric actuator enabling the spring to be compressed or extended. Or the spring is connected to a high-voltage alternating current, direct current or pulsating current generator capable of generating 100 volts to 1000 kilovolts. The spring will be more or less extended or compressed according to the electric voltage applied, but also the speed and temperature of the gases circulating in the cyclone. This compression or extension causes the distance between the spring and the electrode at the apex of the cyclone, and the distance between the turns of the spiral of the spring to vary, enabling adjustment of the type of gliding arc obtained with regard to the gas and particle flow and physicochemical parameters in the cyclone. Under the action of the electric potential, arcs form between the ground electrode and the spring. These electric arcs are then pushed toward the ring electrode by the flow rotating in the cyclone. These arcs interact with the particles and the gases passing through the cyclone, creating reactive molecules (free radicals and charged molecules), which will interact with one another and on the granules so as to form CO and H2 while limiting the production of methane. During the formation of the electric arcs, the variation in the electric circulation in the spring causes variations in the magnetic field induced by the solenoid of the spring. These variations in the magnetic field will increase the kinetic energy of the polar and charged molecules, making them more reactive.

In certain embodiments, methane and water vapor will be injected into this stage of the GlidArc cyclones so as to promote the r3 and r4 reactions.

In certain embodiments, microwaves are injected into the cyclone. Under the action of the microwaves, the kinetic energy of the molecules charged under the effect of the arcs (in addition to the dipole molecules) increases the temperature of the gas, making it even more reactive, and currents induced in the spring will trigger electric arcs between the spiral electrode and the electrode at the top of the cyclone. Under the action of the microwaves, the cyclone with a helical electrode can operate in GlidArc mode without being subjected to electric voltage.

2.6 In certain embodiments, at least three cyclones each comprise a helical electrode (FIG. 6.55), are arranged in a rose pattern (FIG. 6.57) around the opening of the skirt of the last cyclone ending the inner pipe of the FBCB_dc (FIG. 6.58). The helical electrodes of these cyclones will be constructed on the same principle as the electrode described in point 2.5; however, the production scale will be reduced. Indeed, the pipes constituting the cyclones will have a diameter of between 20 and 400 millimeters ending with an open cone. The pins of the electrodes are either connected individually to the outside of the reactor as described in point 2.5, or all of the pins of the electrodes are connected to a star-shaped structure (FIG. 6.56), enabling them to be actuated at the same time. In certain embodiments, the star-shaped structure will be hollow at its center, allowing the rotation pin of the basket described in point 2.3 to pass. A hollow pin starting at the star is connected to a perpendicular electrically insulating pin. This pin enables all of the springs of the cyclones to be compressed or extended simultaneously. The opening of the rose element defined by the GlidArc cyclones forms the passage for the rising flow common to the cyclone represented by the outer pipe and the superimposed cyclones of the inner pipe. In the top portion of each gliding arc cyclone, a gas supply pipe is implanted tangentially to the wall of the cyclone, and the pipe opens into the inter-pipe space opposite the vortex of the outer pipe near its wall (FIG. 6.64). The arrangement of the supply pipe enables some of the gases of the vortex of the outer pipe to rush into the cyclones of the rose element, creating a vortex in each of them. The top portion of each cyclone will be closed by caps (FIG. 6.58) pierced at the center by the passage of a hollow cylinder forming a pipe in the top portion of the cyclone (FIG. 6.59). This cylinder enables the rising flow at the center of the GlidArc cyclone to be recovered, so as to be led into the inter-pipe space. The portion of the cylinder located in the inter-pipe space is curved and is directed toward the wall of the outer pipe of the FBCB_dc, so that the opening orifice is near the wall of the outer pipe. In one embodiment, the rising flow pipe of the GlidArc cyclones is curved so as to deliver the gases in the direction of rotation of the gas vortex of the outer pipe of the reactor. In a preferred embodiment, the rising flow pipe of the GlidArc cyclones is curved so as to deliver the gases perpendicularly to the direction of rotation of the gas vortex in the outer pipe of the reactor. In this configuration, the gases of the rising flow are suctioned by the vacuum created by the vortex according to the Bernoulli law.

The portion of the cap of the GlidArc cyclones located on the side of the skirt of the last cyclone of the inner pipe is pierced with slots (FIG. 6.60) surrounded by oblique blades (FIG. 6.61) enabling gases to enter the GlidArc cyclone, imparting a rotation on said gases in the same direction of rotation as the vortex of the cyclone. The slots will have a size sufficient to allow the granules coming from the upper stage to pass. These slots will be connected by a channel (FIG. 6.63) to the gas and granule outlet conduits of the cyclone of the upper stage, in which these conduits are organized around a short cylinder of vertical columns arranged leaving the orifice of the skirt of the upper cyclone. The cap of the GlidArc cyclones is made of an electrically conductive material, so as to form one or two electrodes, which are grounded and/or have a negative potential.

2.7 The granules used for the gasification can contain aluminum or aluminum oxide, magnesium or magnesium oxide particles or any other metal capable of acting as a reducer. Under the action of the microwaves, currents induced in the conductive particles generate electric arcs between particles, thus creating, over their passage, free radicals and charged elements. The free radicals and the ions formed react with one another and with the carbon present in the reactor so as to produce CO and H2. Aluminum atoms reduced by the electric arcs and/or the magnesium atoms break down the water molecules to release H2, or break down the CO2 molecules to release C. Cascades of more or less complex reactions result in the formation of CO and H2. The aluminum and magnesium oxides produced are regenerated during the reaction into aluminum and magnesium by the action of the electric arcs and UV radiation of the plasmas induced by the electric arcs and the microwaves in the reactor.

In another embodiment, SiO2 (silicon) particles or a mixture of Si (silica) and SiO2 (silicon) particles finely ground with a uniform or non-uniform size of between 1 nanometer and 2 millimeters will be added to the granules of the gasifier.

These silica-based particles will produce, under the action of heat, carbon monoxide and silicon carbide SiC, an inert compound capable of sustainably trapping carbon, improving the pollution balance of the gasification process.

According to the reaction:

$SiO_2+3C->SiC+2CO$     r5

$Si+CO_2->SiC+O_2$     r6

$Si+O_2->SiO_2$     r7

$Si+2H_2O->SiO_2+2H_2$     r8

$Si+SiO2<->2SiO$     r9

$Si+CH_4<->SiC+2H_2$ minority     r10

$Si+C->SiC$ minority     r11

$SiO2+3CH_4->SiC+2CO+6H_2$     r12

Or any combination of reactions r5 to r19 . . . .

These particles, based on silicon or silica, can be added in the form of fine particles (smaller than 500 microns) in the gases injected in the gasification.

The SiC obtained after gasification may serve as a catalyst for Fischer-Tropsch syntheses.

The SiO2, SiO and SiC resulting from these reactions are inert at room temperature and represent, in the form of SiC, a means for trapping the carbon coming from the CO2 and storing it.

2.8 At the apex of the outer pipe of the FBCB_dc, a pipe is nested between the inner pipe and the outer pipe of the reactor (FIG. 4.65). It is a pipe for guiding, at the end of the course of travel, the rising flow, along the inner pipe of the core (flow guide). The flow guide is arranged slightly set back from the two inner (FIG. 4.33) and outer (FIG. 4.34) pipes of the core. Blades (FIG. 4.66) are arranged between the outer pipe and the flow guide, with an inclination similar to that of the profiled structure arranged on the wall of the inner pipe, above the outlet nozzles of the cyclones. The combustion chamber leading into the inner pipe is placed above the core of the reactor, and the base of this chamber (FIG. 4.67) is attached at the top of the outer pipe and the inner pipe of the reactor. The base of the reactor forms, with the inner pipe, a circular housing, separated by a curtain of inclined blades of a second housing formed with the outer pipe. Rising between the inner pipe and the flow guide, the gases of the rising flow are heated in the chamber formed with the inner pipe and the base of the combustion chamber. The heated gases pass through the curtain of blades where a rotating descending movement is imparted on them, in the same direction of rotation as the direction in which the gases are pulsed in the combustion chamber. The gases then enter the region formed by the outer pipe and the flow guide to form a rotating descending vortex along the wall of the outer pipe of the tank.

2.9 In a specific embodiment, microwaves will be pulsed into the outer pipe of the reactor core. These microwaves may, for example, be injected blow the inner pipe, in the cylindrical region of the outer pipe, from at least one microwave source, preferably a magnetron.

2.10 In certain embodiments, gas mixtures consisting of all possible proportions (CO2, H2O, CH4) are injected tangentially to the wall of the outer pipe in the inter-pipe space.

2.11 In a specific embodiment, the solar radiation will converge or be reflected in an image at the surface of the reactor core. The reflected image will have a size less than or equal to the diameter of the reactor core so that all of the energy reflected will be absorbed by the reactor, and the region receiving the radiation will be black and the coating will optionally contain quantum particles to prevent any reflection of UV radiation. The convergence or reflection may, for example, be achieved by means of flat, spherical or ovoid mirrors, or by multiple flat or spherical mirrors mounted on a flat, ovoid or spherical structure. A single convergent lens, or a Fresnel lens may optionally be used to cause the light rays to converge. In general, the reflection or the convergence of the solar radiation on the reactor may use any type of solar furnace, or light reflection means so as to reflect the sunlight at the surface of the reactor. The regions receiving the solar radiation will be made of metal or metal alloys, coated with metal or metal alloys capable of withstanding high temperatures of above 1000° C., and preferably temperatures above 2000° C.

2.12 In another embodiment, the outer pipe of the FBCB_dc will be equipped with at least one quartz window or any other transparent material resistant to temperatures of 1500° C. The solar radiation will converge or be reflected in an image inside the reactor core (through the window) by one of the processes described in 2.11. The images will have a size less than or equal to the diameter of the window so that all of the solar energy will penetrate the interior of the reactor. In certain embodiments, the sunlight may be injected, whether for reactors with a single-tube core or reactors with a double-tube core, directly into the combustion chamber.

In other embodiments, the solar radiation is injected into the combustion chamber directly by using Fresnel lens with a large diameter (between 50 centimeters and 10 meters). The lens will cause the solar radiation to converge at the center of the combustion chamber.

Figure 7:
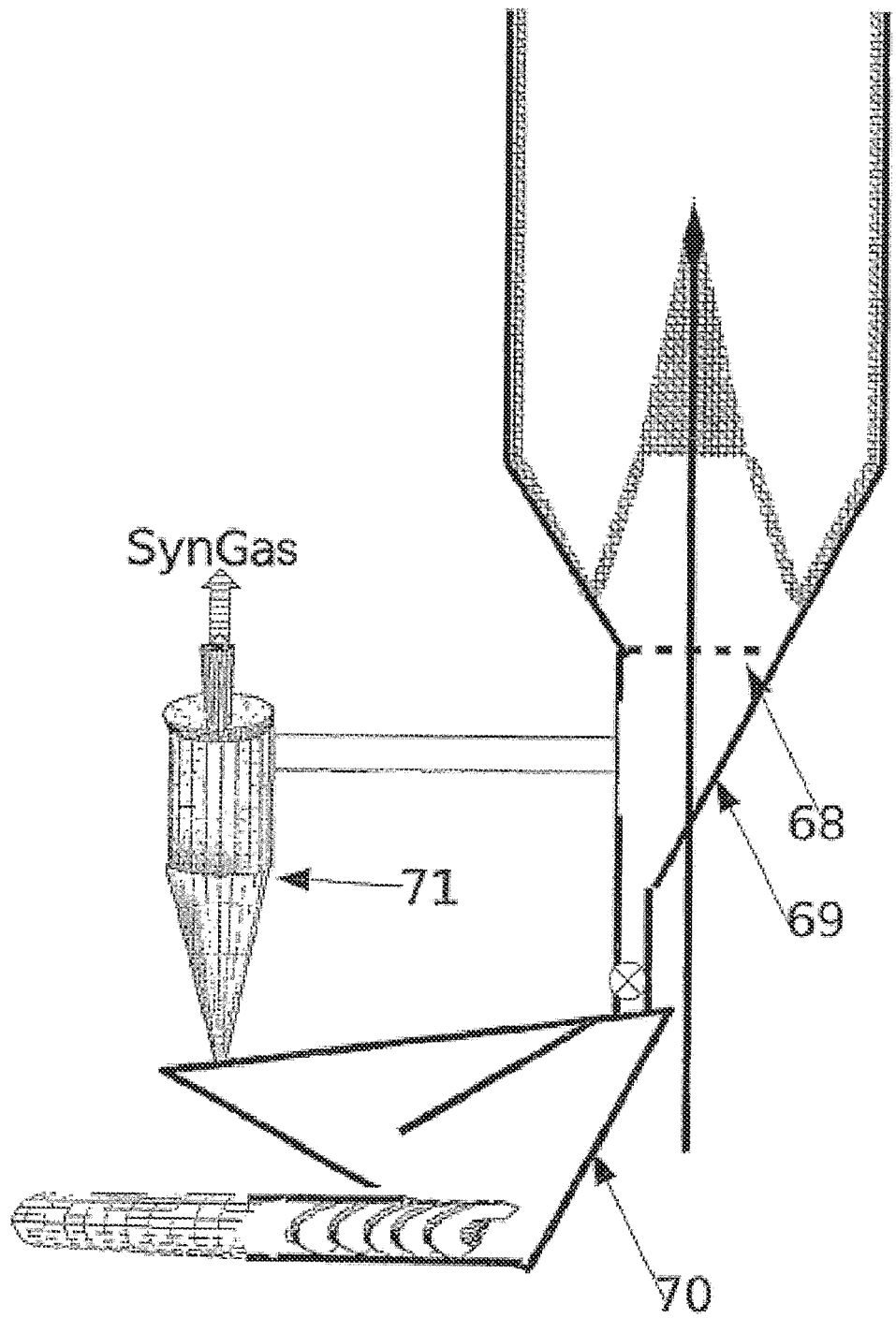

2.13 After passing into the last cyclone, the granules are deposited at the base of the reactor or the basket so as to complete their gasification. The base of the reactor corresponds to the last part of the pipe forming the FBCB-type core or the outer pipe of the FBCB_dc-type reactors. The opening of the base of the reactor will be obstructed by a screen (FIG. 7.68) of which the holes will be large enough to allow the ash and very small coal particles (on the order of several millimeters) to pass. The size of the pores will be between 500 micrometers and 0.5 millimeters. The screen will be mobile, and it may be lowered or raised and rotate, whether by a manually-actuated or powered screw system or by a hydraulic or pneumatic actuator system, or by a screw and spring system, or any other system enabling a combination of the three movements to be performed. In certain embodiments, the system enabling the screen to move will simultaneously transmit rapid upward vibration movements so as to remove the ash and avoid compression of the granule bed. The base screen may also be connected to an ultrasound source so as to scale the ash and promote gasification for the aforementioned reasons. In general, the entire reactor may be connected to continuous or alternating (pulse) ultrasound sources so as to facilitate the passage of flows in the grooves, the screens or the granule bed and promote gasification. After the screen, a semi-conical structure (FIG. 7.69) enables the ash to be directed into an ash tank (FIG. 7.70). The tank and the semi-conical structure are separated by an isolation system, for example a pneumatic valve or any other system enabling the ash tank to be isolated from the conical structure. A pipe connects the semi-conical structure to the inlet of a gas/particle separation cyclone (FIG. 7.71). A pump or a turbopump can optionally be inserted between the semi-conical structure and the separation cyclone, and enables the gas outlet of the reactor to be regulated. In certain embodiments, the separation cyclone will be a cyclone with a tangential charge and an axial discharge, but any other type of cyclone may be suitable, including centrifugation- or filter-based systems.

The ash outlet of the separation cyclone leads into a second ash tank. The two tanks are connected by a worm screw enabling evacuation and recovery of the ash. In a certain embodiment, the ash outlet of the separation cyclone leads into the same ash tank as the gasifier (FIG. 7.70).

When biomass is used to produce char, the ash obtained is rich in potash, which will be used to saponify the plant-based oils, in order to produce esters and glycerol (principle of soap production). These reactions can be produced in the solar/microwave furnace reactor (F_smo) described in point 1.3.

The esterification reaction can be broken down, for example, into four steps:
  1) saponification of fats and oils;
  2) separation of saponified fatty acids and glycerol;
  3) activation of saponified fatty acids, for example by a reaction with a phosphorus halogenide ($X_3P$) (X=I, Br, Cl, F, etc.) to form $RCOOPX_2$ or RCOX (phospho diester or alkaloid halogenide);
  4) reaction between the alcohol and the activated ester to form an alcohol ester.

The activation reaction can optionally be obtained with a strong acid such as HX by forming alcohol halogenides.

2.14 In a specific embodiment, the last cyclone of the inner core (inner pipe) of the cyclone reactor will end with a closed inverted cone (FIG. 12.89). Tubes starting at the wall of the cone extend in a direction perpendicular to the main axis of the cyclone (FIG. 12.88), which we will call suction wells in this document. Preferably, three suction wells are arranged at 120° with respect to one another. Opposite each suction well and perpendicularly to the direction of the well, a burner (FIG. 12.87) is placed, enabling the pyrolysis gases or additional gases to be burned so that the combustion gases have a direction perpendicular to the opening of the well, thus suctioning the particles, which arrive at the base of the last cyclone, toward the flame of the burner, by a Bernoulli effect. In addition, the direction of the flames of the burners, more or less parallel to the direction of the vortex, maintains the gas vortex created in the outer pipe of the double-core reactor. The suction well-burner system thus enables the ash that falls to the base of the last cyclone of the inner pipe to be extracted and the last carbon particles, which have not yet been reacted, to be gasified.

Figure 13:
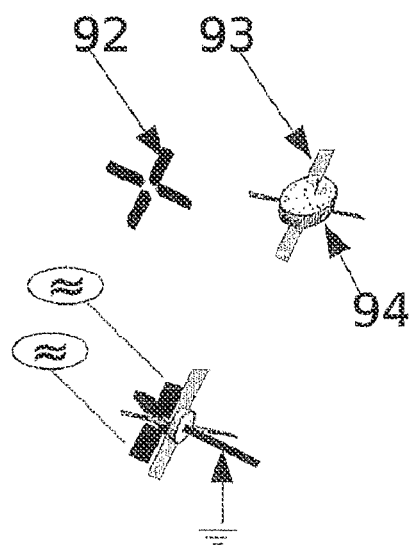
FIG. 13 shows a propeller.

2.15 In a specific embodiment, the electric gliding arc (GlidArc) processes used to reduce various undesirable chemical forms, which can form during gasification, such as H2S or NO3, etc., will include an electrode system, comprised of an impeller (FIG. 13.93) or a rotor with rotating blades and a stationary screen arranged as a cross (FIG. 13.92) or a multi-branch star, introduced at various places in the cyclone reactors or Tb_smo. Each arm of the screen will be brought to an electric potential, continuous or alternating, between 100 Volts and 1000 kilovolts, while the impeller or the blade rotor will be connected to the ground. By rotating under the action of the gases circulating in the reactors, each blade of the impeller or rotor passes opposite a bar of the cross or star. The distance between the rotor or the impeller and the cross or star will be such that one or more electric arcs may form between said blade and a bar of the cross or star. By moving away from the bar, the blade stretches the electric arc, thus conferring the properties of the gliding arc thereon, generating non-equilibrium plasmas. The scenario of the formation and stretching of the electric arcs reoccurs upon each passage of an impeller or rotor blade opposite a bar of the star or cross. In certain embodiments, the connection to the ground and to the electric potential can be inverted between the rotor or the impeller and the star or the cross.

In certain embodiments, disks arranged at the level of the rotor or the impeller (FIG. 13.94) and/or the cross or the star enable the efficiency of the catalyzed reactions to be improved.

The impeller/rotor and cross/star GlidArc device can be arranged at various locations in the process, in particular at the level of the T-conduits for expulsion of the rising gases in the cyclones of the inner pipe of the cyclone reactor or after the gasification reactor at the outlet of the separation cyclone between the gas and the ash.

3.1 The gases (CO2, H2O, CH4, O2) supplying the cyclone gasification reactor can be compressed, accelerated and heated by different processes using pumps and conventional furnaces. However, in a specific process, all of the gases supplying the cyclone gasification reactor are heated and pressurized by solar/microwave furnace turbopumps.

A solar/microwave turbopump (Tb_smo) consists of a pipe (FIG. 8.72) with a diameter of between 1 centimeter and 5 meters and a length of between 10 centimeters and 5 meters. The dimensions of the Tb_smo will depend on the nature and use of the compressed and heated gases. Preferably, the Tb_smo will have a diameter on the order of 20 centimeters and a length on the order of 1.5 meters, in order to compress and heat the gases intended for the cyclones. They will have a diameter on the order of 10 centimeters and a length on the order of 70 centimeters in order to heat and compress the gases intended for the burners of the combustion chamber. The pipe constituting the Tb_smo may be confined in a transparent chamber under vacuum or containing gases having the same properties as those of the confinement chamber of a F_smo.

In a preferred embodiment, the inlet of the pipe of the Tb_smo opens into the transparent confinement chamber so that the gas limiting the heat loss can penetrate the pipe of the Tb_smo reactor.

The inlet of the pipe of the Tb_smo reactor will however be closed by a porous body requiring numerous contacts between the gas penetrating the pipe of the Tb_smo reactor and the mesh of the porous body. The porous body, preferably made of ceramic, has a large exchange surface and will act as an absorber of the solar radiation, improving the thermal inertia of the Tb_smo reactor. The porous body will, for example, be a honeycomb-type multichannel monolith, for example, made of cordierite or a porous ceramic foam made of silicon carbide SiC. In this embodiment, greenhouse gases such as CO2, NH4 or H2O will be preferred as gases limiting heat losses. The gas limiting heat losses is injected into the confinement chamber opposite the opening of the reactor pipe. The gas then circulates in the transparent confinement chamber insulating the wall of the Tb_smo reactor pipe from that of the transparent confinement chamber. In this way, the gas captures the infrared radiation coming from the wall of the reactor Tb_smo pipe heated by the solar radiation and internally by the microwaves, heating itself as it travels to the inlet of the reactor pipe. The gas then rushes into the pipe of the Tb_smo reactor, through the porous body where it is further heated in contact with the porous structure. The gas then penetrates the portion of the pipe of the reactor, to the rotors where it is accelerated, compressed and heated.

Figure 8:
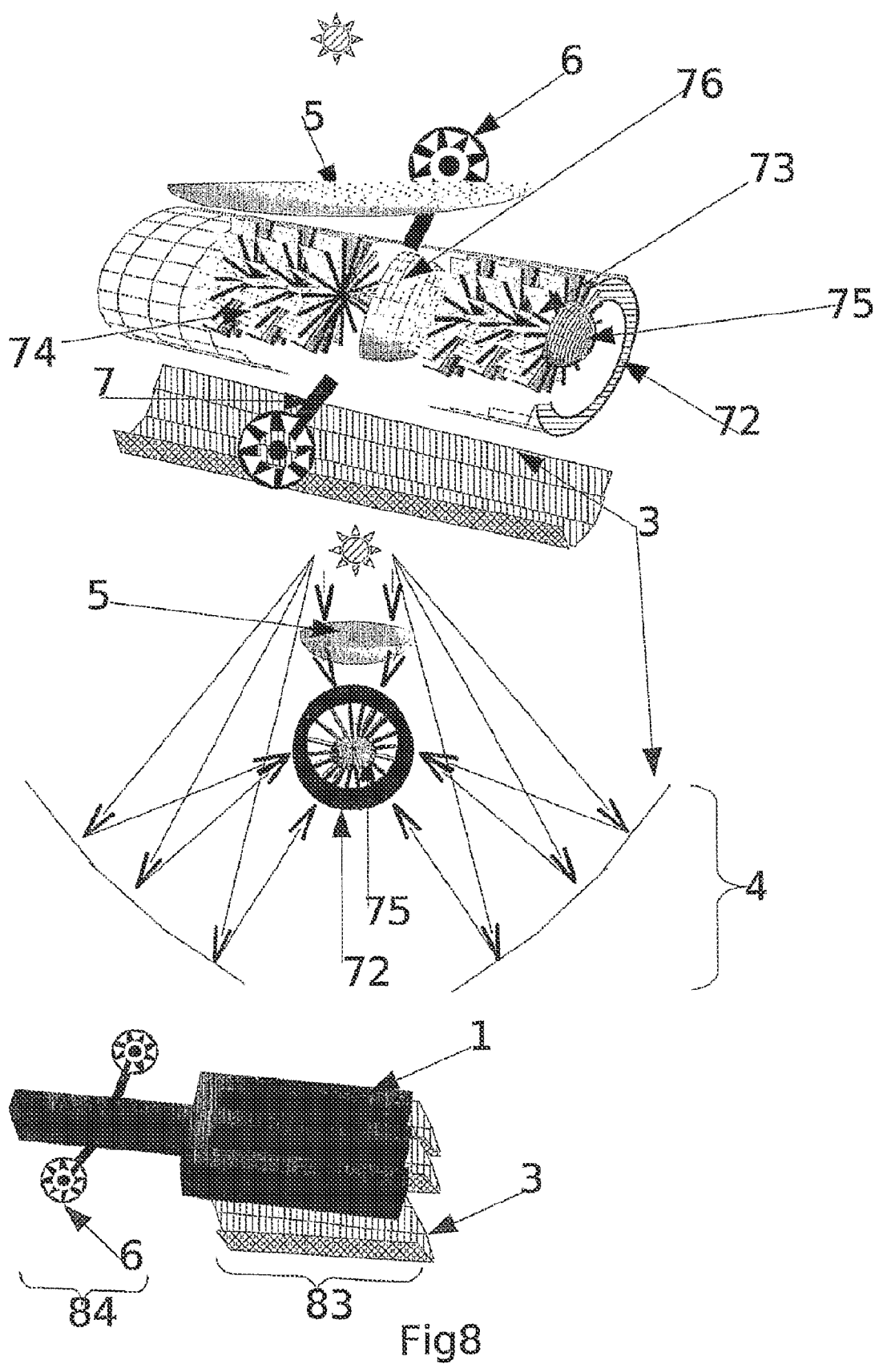

At least one pin is arranged at the center of the pipe. This pin is equipped in two regions with rotors, located on the first third (FIG. 8.73) and the last third of the pin (FIG. 8.74). Each region of rotors consists, for example, of three rotors consisting of 60 blades arranged every 6° in a rotation about the pin. The blades are more or less inclined; however, the inclination of the rotor blades of the last third of the pin corresponding to the turbine stage may be greater than that of the blades of the first third corresponding to the compressor stage. The number of rows of rotors is merely provided as an indication, and can be decreased or increased according to the power or the size of the pump. The size and the inclination of the blades will depend on the pressure to which the turbine is subjected. The number of blades per rotor is merely indicative, and will vary according to the size and power of the Tb_smo. The rotor pin optionally has an ovoid shape (FIG. 8.75) enabling the volume inside the reactor to be decreased progressively to the level of the first rotor region. In this same region, a bulging of the wall of the pipe or a bending of same progressively reduces the cross-section of the pie over the entire portion of the first rotor region. In the part located behind the first rotor region, at the level of the second third of the pin, an annular microwave chamber (FIG. 8.76) surrounds the rotation pin of the rotors. In certain embodiments, the annular chamber is integral with the pin and rotates with it. The wall of the annular chamber that surrounds the pin is longer than that opposite the pin. The wall of the annular chamber opposite the pin forms, with the wall of the pipe of the Tb_smo, a passage through which the gases can penetrate the area behind the annular chamber. The walls of the annular chamber are made of a material enabling the microwaves to be reflected and capable of withstanding high temperatures, on the order of 2000° C., typically aluminum titanium alloys, nickel tungsten alloys, stainless steels, vitreous ceramic-coated carbons, ceramics or any other sufficiently refractory compound. Microwaves are injected into the annular chamber so as to cause them to reflect on the wall surrounding the rotation pin with an angle adequate for causing them to bounce toward the inside of the annular chamber. The microwaves are injected just after the wall of the annular chamber opposite the pin. The microwaves will be produced at least by a magnetron. Preferably, four magnetrons (FIG. 8.6) will inject, in a cross arrangement, microwaves into the annular microwave chamber. The waves are injected into the annular chamber by means of waveguides (FIG. 8.7). In general, any energetic radiofrequency source capable of being directed by waveguides, for example, can be used. Under the action of the microwaves, the gases contained in the annular chamber undergo significant heating, which dilates them and expels them through the rotors of the last third of the pin. Under the action of the passage of gases in the rotor of the last third, the pin beings to rotate, the blades of the rotor of the first third of the pin propel the gases toward the annular chamber while compressing them due to the shrinkage of the cross-section. The gases compressed and heated by the microwaves in the annular chamber maintain the movement by their expulsion through the blades of the rotors of the last third of the pin. In the configuration in which the mirrors and the lenses are regularly distributed along the pipe of the Tb_smo, the solar thermal energy is involved in the gas compression only by the uniform dilation caused by the accumulation of heat (PV=NRT). However, for the solar thermal heat also to be converted into kinetic compression energy, the mirror surface and the lens size can be locally increased at the region of the rotors of the last third of the pin. The additional solar energy provided at this level will further heat the gases, accelerating the speed of the pin, and therefore the compression.

In certain embodiments, the rotors of the first third of the pin can be replaced by a centrifugal compressor. In this configuration, the diameter of the pipe of the Tb_smo will be increased at the compression stage so as to be capable of receiving it.

The Tb_smo can serve as a basis for designing new generations of turbojet engines used to propel vehicles (air, ground, sea, etc.). It is possible to increase the power of a reactor by adding, between the stage, or the compression stages and the turbine stages of a reactor, an annular microwave chamber containing waveguides injecting microwaves from magnetrons, thus leading to even more expansion of the gases. This expansion may be increased by adding water, which would be vaporized by the microwaves and participate in the propulsion. This process would enable the consequences of the presence of water in the fuel to be limited, as the water present in the fuel would be vaporized by the microwaves and would serve for propulsion.

The electric consumption of magnetrons may be compensated by introducing, perpendicularly to the rotation pin, one or more "tesla" bar magnets (for example, a bar of 2.5 teslas with a longitudinally-oriented magnetization). The magnet bars could directly be rotor blades of the compression stage, for example.

Perpendicularly to the plane of rotation of the magnets, one or more coils, made of copper wires or wires of any other metal, and superconductor wires (for example, a carbon nanotube braid, etc.), is arranged in or on the pipe of the Tb_smo or the turbojet. The rotation of the pin will cause the production of a magnetic field rotating perpendicularly to the plane of the coil, enabling a large amount of electric current to be produced.

As H2O has high dipole moments (1.85), the heating and compression of this gas by the Tb_smo will be very effective. At the outlet of the Tb_smo, the heated gases may be directly injected into the different cyclones of the cyclone gasification reactor. However, as methane, CO2 and air have lower dipole moments on average, they should preferably be mixed with water vapor so as to be heated and pressurized by a Tb_smo before being injected into the burners of the combustion chamber.

The pyrolysis gases, naturally rich in water, may be heated and pressurized effectively by a Tb_smo before being injected into the combustion chamber.

An alternative for avoiding the addition of water to the gas consists of ionizing it with electric discharges during its contact with the microwaves.

A portion of the water vapor used in the cyclone gasification reactors will be produced from liquid water evaporated in a solar/microwave furnace (F_smo). The rest of the water vapor comes from the water contained in the biomass or produced during combustion in the combustion chamber. The pressure of the injected gases varies between 1 and 2000 atm.

3.2 In certain embodiments, the Tb_smo enables cyclones of sand or another abrasive body such as stacked pumice, silicon carbide or any other abrasive body (FIG. 3.27) to be projected into the tangential inlet of the cyclones. This projection of abrasive bodies enables the char particles to be eroded very quickly, increasing the efficacy of the gasification.

In certain embodiments, the abrasive body will be preheated at between 200 and 600° C. by a F_smo before being projected tangentially into the cyclones or optionally mixed with the raw material during the torrefaction or pyrolysis phase so as to accelerate it.

3.3 In certain embodiments, the F_smo will be segmented into a solar part and a microwave part. The solar part will be arranged as a comb (FIG. 8.83) so as to increase the efficacy of the heating. The assembly of teeth of the comb is connected to a single pipe containing microwave sources. In a more preferable embodiment, the teeth of the comb are filled by porous bodies opening into the confinement chamber.

In certain embodiments, the ends of the comb will lead to the open air, thus enabling the air to be suctioned and heated. The warm air can be used to dry the raw material before torrefaction or pyrolysis.

Similar assemblies can be envisaged for the Tb_smo.

In certain embodiments, the microwaves can be coupled with infrared radiation sources. This second source of radiofrequencies induces asymmetric movements in the molecules. Indeed, the infrared energy is essentially absorbed by the vibrations of the chemical bonds of the molecules. This creates, in addition to the increase in temperature of the molecule, occasional asymmetric vibration modes generating a transient dipole moment. Apolar molecules therefore become temporarily sensitive to microwaves.

In certain embodiments, the combination of microwaves and infrared frequencies will be used to heat gases such as CO2 for the various configurations envisaged.

4.1 In certain embodiments, the cyclone gasification reactor will be entirely heat-insulated, including the cyclone for separation of gas and ash after leaving the cyclone reactor. This thermal insulation can be obtained, for example, by covering all parts in contact with ambient air with a heat-insulated product (rock wool, ceramic, etc.).

In a specific embodiment, the entire cyclone reactor will be contained in a calorimetric chamber or a thermos, which will maintain a high vacuum between the walls of the cyclone reactor and the confinement chamber. The vacuum will be either static by sealing the calorimetric chamber, or dynamic by pumping the air contained in the calorimetric chamber. This pumping may, for example, be performed with a Tb_smo or a Tb_smo capable of ionizing the gases.

4.2 At the outlet of the cyclone gasification reactor, after passing through the dust and gas separation cyclone, the gaseous mixture comprised primarily of CO and H2 may contain more or less non-reduced CO2. According to the gasification adjustments, the outlet gas composition will be (not including water vapor) 37% CO, 27% H2, 7% CO2, 6% O2 and 1.5% CH4. These proportions are merely provided as an indication and can vary significantly according to the adjustment of the apparatus. However, these values indicate that the proportions of CO and H2 may not correspond to those necessary for the Fischer-Tropsch syntheses. To correct imbalances, the CO2 can be separated from the other gases. Any method for separating CO2 from other gases can be used, in particular cryogenic methods.

However, these processes consume large amounts of energy.

In a specific embodiment, we will take advantage of the fact that CO2 has a water-solubilization coefficient ($76.6\ 10^{-3}$ moles/liter at 0° C. and 1.013 bar) much higher than that of CO ($1.5\ 10^{-3}$ moles/liter at 0° C. and 1.013 bar), CH4 ($2.4\ 10^{-3}$ moles/liter at 0° C. and 1.013 bar) and H2 ($0.9\ 10^{-3}$ moles/liter at 0° C. and 1.013 bar).

At the outlet of the gas and ash separation cyclone, the gases pass through one or more heat exchangers, in which they transfer their heat to:
water,
water vapor,
CO2,
the syngas mixture intended to react in a Fischer-Tropsch reactor,
products intended to be refined,
in general, any product requiring heat during its conversion cycle.

After being brought to room temperature, the gaseous mixture is bubbled in a separation tank containing water. The water volume of the tank may, for the purposes of indication, be between 10 and 1000 liters. The volume of the tank can exceed 1000 liters for very large volumes of gas to be treated. The tank is hermetically sealed, and a valve in the up position (above the water) enables the non-dissolved gases to leave. The separation tank is optionally thermostatically controlled at a temperature of between 0 and 35° C. The injection of gases into the tank is performed at a pressure of between 1 and 100 bar. The temperature of the tank can be below 0° C. if the water contains antifreeze or saline products enabling better dissolution (the temperature may vary from −20° C. to +35° C.)

Water is pumped from the tank before being reinjected after degassing. The pumping takes place at a great distance from the bubbling point of the gases, in an area where there are no bubbles in suspension. The flow rate of the pumped water can be proportional to the bubbling rate of the gases in the tank. It can be adjusted according to the proportion of CO2 in the gaseous mixture and the rate of solubilization of the CO2 so as to optimize the dissolution of CO2 and limit that of the other gases. The proportion of CO2 dissolved in the water will depend on the physicochemical properties of the water, in particular the pH and the saline concentration. The pH will preferably be basic in order to increase the CO2 dissolution rate. This pH can in particular be adjusted on the basis of the ash resulting from the gasification of the char, generally rich in potash. CO2 dissolves quickly in water, while the other gases primarily pass into the air portion of the tank. Depending on the origin of the raw material used for the pyrolysis, the gases leaving the cyclone gasification reactor will be more or less contaminated by NOx, HSx, heavy metals, and so on.

These compounds generally have very high solubilization coefficients in water (or in certain solvent mixtures) and will therefore be dissolved during bubbling in a suitable solvent. In certain embodiments, water (or any other solvent) pumped from the tank will be treated by a process of reverse osmosis or filtration in order to concentrate the different solutes dissolved during bubbling into a brine, including the CO2 dissolved in the form of H2CO3. Numerous water treatment processes already exist and can be used (desalting, water purification, distillation, and so on).

The water pumped in a laminar flow directly or optionally after filtration is degassed by subjecting it to ultrasound, or to a high vacuum, or to rapid heating. A combination of these three treatments can be applied simultaneously or sequentially. Preferably, the water will be degassed by the action of the vacuum and the ultrasound. The gases resulting from the degassing consist primarily of CO2 and optionally NOx and HSx. The CO2 may be reintroduced in a gasification cycle by being reintroduced into the cyclone gasification reactor after heating if it is pure enough. The gas mixture obtained may optionally be subjected to a liquid/gas phase reduction at the interface of a plasma created by an electric arc between two hollow or porous carbon electrodes. During this reduction phase, NOx and HSx will be reduced to sulfur or N2 or into compounds with an intermediate oxidation number (this reduction may be completed by an electric GlidArc-type treatment).

The carbon electrodes used for these reductions may contain additives such as aluminum, magnesium or any other reducing metal, for example in the form of a powder highly agglomerated with carbon particles. These metals promote the production of CO and H2 by reacting with water, CO2 or the carbon of the electrodes. The metal oxides generated by the oxidation-reduction reactions are regenerated by the electric currents and intense light of the plasma; in particular MgO is reduced into Mg and oxygen (the oxygen will react with the carbon) by the plasma. The carbon electrodes can optionally contain Si and SiO2 additives, which will react with water, CO2 and carbon to produce CO and dihydrogen and SiC. The additives can also be present in the water of plasma reactors. The distribution of the additive powders in the electrodes will be uniform or non-uniform, for example in a series of layers separated by layers containing only carbon. The carbon of the electrodes will come, for example, from the ash recovered by the worm screw, which passes into the ash tanks of the cyclone gasification reactor and the gas and ash separation cyclone.

After cooling, one or more heat exchangers recover(s) at the level of the worm screw in order to heat products requiring heat during their conversion cycle, and the cold ash is washed in a hydraulic cyclone. It is then ground into very fine, uniform or non-uniform particles, with a size of between 1 micrometer and 1 millimeter. The particles are optionally mixed with different compounds (metal, phosphorus, Si, SiO2 particles, etc.) promoting reduction of the CO2 and oxidation of the carbon. A paste is produced from the particles, and will be molded or drawn and compressed into an electrode, after the optional addition of a cohesion agent such as a glue or a resin resistant to water, based on a carbon compound, for example, or any cement.

After reduction in the plasma of the electric arc, the recovered gases will be subjected to another separation step.

The water for washing the ash, which is very basic due to the potash that it contains, will be used to increase the pH of the tank of water for gas separation, or as a brine for saponification of fats and oils in a F_smo intended for this purpose (points 1.3 and 2.13). In general, all of the bubbling and washing water is retreated by reverse osmosis, filtered and subjected to an electrical reduction with hollow carbon electrodes. Distillation methods can also be envisaged.

4.4 The gases recovered in the air portion of the separation tank forms a syngas comprised primarily of CO and H2. The gases are recovered through valves calibrated so as to open at a predefined pressure. Nevertheless, small percentages of CO2, CH4 and O2 on the order of 1 to 3% remain for each compound.

In order for the reaction (Ft)

(general FT): $nCO + 2nH_2 \rightarrow -(CH2) - + nH_2O \Delta H_{298} = -165 KJ.\text{mole}$ formation of alkanes: $nCO + 2(n+1)H_2 \rightarrow CH_{2n+2} + nH_2O \, 2nCO + (n+1)H_2 \rightarrow CH_{2n+2} + nCO_2$ formation of alkenes: $nCO + 2nH_2 \rightarrow CH_{2n} + nH_2O \, 2nCO + n + H_2 \rightarrow CH_{2n} + nCO_2$ formation of alcohols: $nCO + 2nH_2 \rightarrow CH_{2n+1}OH + (n-1)H_2O \, 2(n-1)CO + (n+1)H_2 \rightarrow CH_{2n+1}OH + (n-1)CO_2$ to be efficient, it is necessary for the stoichiometry of the equation to be respected in the syngas mixture used. Indeed, the CO/H2 ratio orients the predominant reactions in the FT synthesis. Moreover, due to different diffusions between CO and H2 in the various existing reactors, the composition of the syngas must often be adjusted according to the FT reactor used. Finally, it is important to minimize the secondary CH4 and CO2 gases produced during gasification.

In a first step, the water contained in the syngas will be removed by condensation of the water vapor, for example in a cooling tower or any means enabling the syngas to be brought to a temperature close to 0° C. The compression of the cooling gas may optionally be performed by a Tb_smo. The liquid water produced will drive some of the CO2 present in the syngas. The CO2 of the condensation water will be recovered by degassing and reintroduced into the synthesis circuit.

The dry syngas will be humidified by water vapor to a percentage defined by the desired final CO/H2 ratio.

Then, the humidified syngas will again be heated to a temperature of between 200 and 1200° C., for example, in a Tb_smo or a simple hollow solar/microwave furnace (without a turbine or a worm screw) or any other means.

This enables H2 to be produced from the CO, to prevent an undesirable production of CO2, according to the reaction:

$CO + H_2O \rightarrow H_2 + CO_2 \Delta H_r(600K) = -39 KJ.\text{mole}$

The CO2 produced can be removed according to one of the processes described above, but these processes risk creating an imbalance in the syngas formula.

An electrochemical CO2 reduction method involving plasmas is preferred.

5.1 In a specific embodiment, the electrochemical reactor will be produced on the basis of a solar/microwave turbopump in which the "solar" part (mirrors and lenses) is removed or reduced to only the part located at the level of the second region of rotors and the annular chamber so as to obtain a solar/microwave reactor or a microwave reactor (R_smo). The pipe forming the R_smo will preferably have a diameter of between 10 and 20 centimeters and will, for example, be made of an electrically insulating material, such as pyrex, quartz, and so on. Conductive materials may be suitable on the condition that they control the path of the currents induced. If materials transparent to microwaves are used, the R_smo will be enclosed in a structure reflecting microwaves, for example an aluminum tube or any other material reflecting microwaves, at least for the region of the R_smo subjected to microwaves (which corresponds to the region behind the first rotor region). At least one rotor of the first rotor region will consist of blades made of an electrically insulating material or insulated from the rotor pin. Said rotors will have at least one electrically conductive blade in contact with the rotor pin, which will itself be electrically conductive and connected to the ground. On the wall of the R_smo, in the plane of rotation of the rotor, at least one electrode subjected to a current of between 100 volts and 1000 kilovolts is provided.

Figure 9:
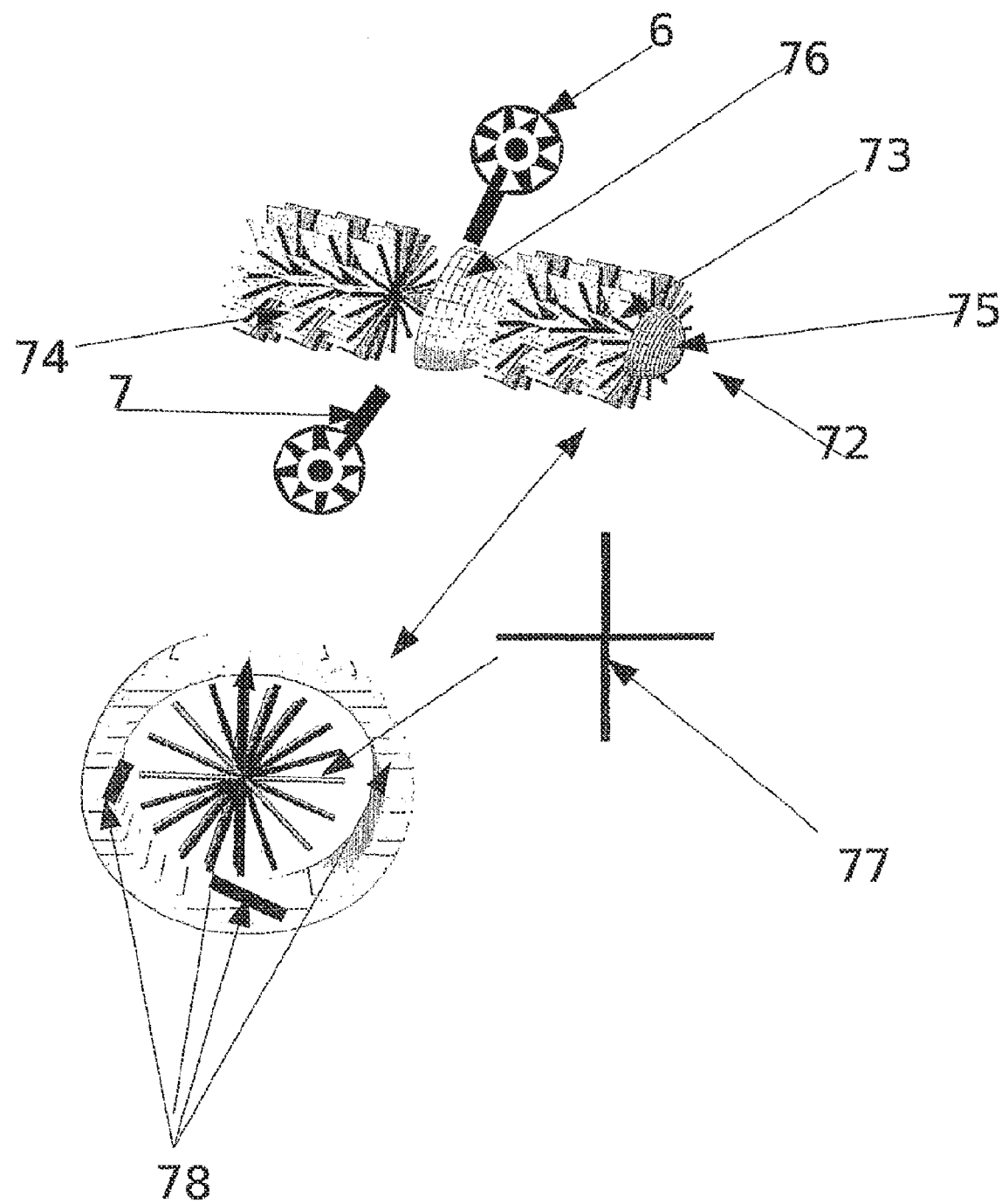
FIGS. 9 and 10 show a turbo pump.

In a specific embodiment, a rotor will consist of four electrically conductive blades in contact with the rotor pin, and the rest of the blades are electrically insulated from the rotor pin or made of an insulating material (for example insulating ceramic) (FIG. 9.77). The conductive blades are arranged in a cross with respect to the pin. The length of the blades is defined so that they are arranged at a distance of between 1 micron and 5 mm from the wall of the tube of the R_smo. In the plane of rotation of the rotor, 4 electrodes are arranged at 90° from one another (with a size of between, for example, 50 microns and 1 centimeter). In certain embodiments, the electrodes may be impeller segments (FIG. 9.78). The end of the conductive blades preferably project so as to promote the formation of an electric arc between the electrode and the blade. Each electrode is brought to the phase of a high-voltage electric generator, while the rotation pin is connected to the ground (a direct current may also be used, and the pin of the rotors and the electrodes will be connected to the terminals of the generator).

During the rotation of the rotor, the conductive blades are brought near the electrodes (between 50 microns and 1 centimeter), and an electric arc forms between the blades and the electrodes. Then, the blades move away from the electrodes, the arc is stretched between the electrodes and the conductive blades, according to the shortest path by crossing the electrically insulated or neutral blades. When the helical electrode is used, the electric arcs may glide along the electrode. In certain embodiments, a plurality of rotor and electrode stages can be added to the system, arranging the conductive electrodes of each rotor in a staggered manner so as to cover the largest possible cross-section of the pipe R_smo.

The balanced syngas containing the undesirable CO2 to which a desired proportion of methane (CH4) has been added is then introduced into the R_smo, where it is suctioned by the first compression stage of the R_smo under the action of the electric arcs and the methane CH4, and a large portion of the CO2 present in the syngas is reduced by the reaction:

$CO_2 + CH_4 \rightarrow 2CO + 2H_2 \Delta H_R(600K) = 205 KJ.\text{mole}^{-1}$

Similarly, a large portion of the H2O still present in the syngas is reduced by the reaction:

$H_2O + CH_4 \rightarrow CO + 3H_2 \Delta H_R(600K) = 205 KJ.\text{mole}^{-1}$ 5.2-1 The electric consumption of the R_smo can be reduced by introducing, in the first rotor region, at least one rotor stage containing at least one stationary magnet and a conductive or superconductor wire coil at the level of the wall of the reactor pipe. The stationary magnets can be electrically insulated blades of the rotors containing conductive blades. In a preferred embodiment, the magnets are integrated in rotors different from the rotors containing conductive blades. The two types of rotors can be either sandwiched or separated in two different parts of the first rotor region. There can be any number of magnetic blades; however, it will be necessary to adjust the number and arrangement of the conductive blades to the shape and arrangement of the magnetic blades and the shape and arrangement of the electric coils.

In a specific embodiment, the number of magnetic blades will be equal to 2n blades, with n being even.

Figure 10:
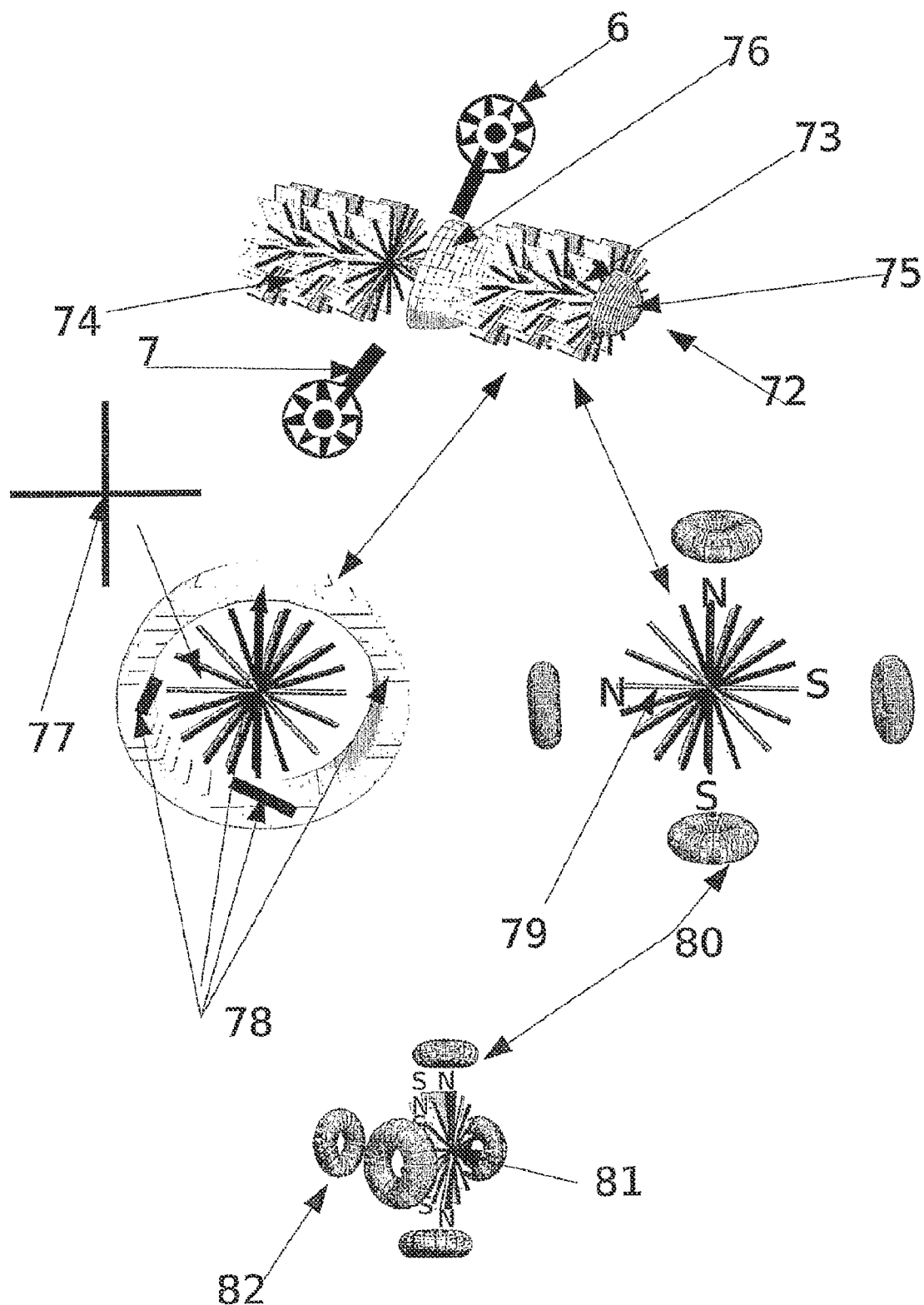

In a specific embodiment in which n=2, the magnetic blades are arranged in a cross (FIG. 10.79). In this orientation, the blades are symmetrical so that two symmetric blades have an opposite polarity "N/S". The magnetic blades will therefore have an angular distance between them of 90°. Solenoids (FIG. 10.80), for example, four of them, may be arranged perpendicularly to the plane of rotation of the rotor containing the magnetic blades. By rotating, the rotor causes the magnetic field in the solenoids to be varied, thus generating an alternating electric current at the same rotation frequency as that of the rotor. By connecting a terminal of the solenoid to one of the electrodes of the pipe of the R_smo and the other to the electrically conductive rotor, which rotates in the plane of the electrodes, the rotation of the "magnetic" rotor generates the electric current, necessary for the production of electric arcs between the electrically conductive rotor and the electrodes of the pipe. In a specific embodiment, the four solenoids will be connected by one of their terminals to a single rotor. Said rotor will be electrically insulated from the pin, but the conductive blades of the rotor will be connected to one another. The second terminal of each solenoid will be connected to one of the electrodes in the plane of rotation of the conductive rotor. The orientation of the solenoids, with respect to the plane of rotation of the rotor containing the magnetic blades, will be defined so that the electric currents induced in the solenoids always have the same direction in the solenoids with respect to the electrically conductive rotor. The electric currents of all of the solenoids connected to the same rotor will go simultaneously, either from the coils to the rotor or from the rotor to the coils.

5.2-2 In a specific embodiment, in one of the configurations of the symmetric magnetic blades described in point 5.2-1, the solenoids are connected to the terminals of an alternating current generator. The two opposite solenoids are connected inversely to the generator, so that the magnetic fields induced are symmetrical with respect to the axis (in opposite directions). The solenoid-rotor system then acts as an electric radial engine actuating the compression stage. The turbine stage can thus be removed, as the electric engine performs the gas compression.

In certain embodiments, the compression stage can be driven by an external electric engine.

5.3 In a specific embodiment, there will be 2n magnetic blades of the rotor, with n being uneven. The magnetic blades are arranged regularly on the rotor, according to an angular pitch of 360/(2n). The magnetic blades are symmetrical, two-by-two, according to the axis of rotation, and two symmetrical blades have an opposite polarity "N/S". By passing through the wheel formed according to the distribution of magnetic blades on the rotor, a regular alternation of North and South magnetic polarity is obtained, which is axially symmetrical. This symmetry causes a North pole to correspond to a South pole with respect to the axis of rotation. Magnetically neutral blades can be inserted between the magnetic blades so as to obtain the desired number of blades in the rotor. These neutral blades may serve as a screen between the magnetic fields of the magnetic blades. The rotation of the rotor generates very fast field variations on the order of 2n times the speed of rotation of the rotor. These magnetic fields vary very quickly in addition to producing a high-frequency current (2n times the speed of rotation), and can very quickly heat molecules having a dipole moment such as H2O, SiO, or certain gases such as helium according to the same principle as ICP.

However, in a configuration of solenoids perpendicular to the plane of rotation of the magnetic blade rotor, the magnetic fields induced in the solenoids will oppose the stationary magnetic field. The intensity of the magnetic fields, varying perpendicularly to the plane of rotation of the rotors, to which the gases passing through the R_smo are subjected, is very low.

5.4 In a specific process, the solenoids of the R_smo will have a Z-shape. The solenoid will consist of a wire forming a semicircle in a higher plane, then falling into a lower plane according to a perpendicular projection. In the lower plane, the wire forms another complementary semicircle, then rises into the upper plane according to an orthogonal projection. A solenoid rotation therefore consists of two semicircles in two superimposed parallel planes connected by two verticals. From a top view, a solenoid rotation appears to be a circle. The operation is repeated many times to obtain a solenoid. The circle shape can be replaced by any geometric shape: square, oval, rectangle, and so on.

The Z-solenoid is placed around the pipe of the R_smo, so that the two semicircles are perpendicular (above and below) to the plane of rotation of the magnetic blade rotor and the two posts connecting the semicircles are parallel to the plane of rotation of the rotor. The two posts can be in the plane of rotation of the rotor or offset with respect to it. By rotating in the plane of rotation, the magnetic blade rotor will produce a variable field through the two perpendicular semicircles of the solenoid. This variable field will induce an electric current and a magnetic counter-field induced opposite the stationary fields of the blades. The current passing through the circuit of the solenoid by passing into the vertical part will create a magnetic field perpendicular to the other magnetic fields and to the plane of the rotors. This field will not be compensated and will be applied to the gases passing through the R_smo.

By using a rotor with n being uneven and with an alternating polarity, it is possible to vary the magnetic field at a frequency of several thousand Hertz (2$n$ times the speed of the rotor). This rapid variation of the magnetic fields induces a magnetic field parallel to the axis of the rotors, which enables the gases to be significantly heated so as to cause them to react. At high frequencies (above 2 MHz), the magnetic field induced can generate thermal plasmas in polar gases such as NH3, H2O, SiO, and so on.

However, in a varying field coupled with an electric arc system, neutral and non-polar molecules such as CO2 become dipoles, which can be heated under the action of varying magnetic fields or microwaves. This type of device will be used to heat the dry CO2.

5.6 In a specific embodiment, the rotor will consist of 2n magnetic blades. Neutral blades can be inserted between the magnetic blades so as to obtain the desired number of blades on the rotor. The magnetic blades are arranged regularly on the rotor, according to an angular pitch of 360/(2n). The magnetic blades are symmetrical, two-by-two, according to the axis of rotation. The two symmetrical blades have the same polarity at the ends "N/N" or "S/S" (FIG. 10.81). The central parts of the blades can be covered with a material forming a screen to the magnetic fields. An alternative consists of producing blades made of composite materials of which only the ends are magnetic. Around the rotor thus formed, an even number of solenoids is arranged according to a central symmetry around the axis of the rotor. Preferably, the number of solenoids will be four (FIG. 10.80). Another solenoid is arranged around the pipe of the R_smo, in a plane parallel to the plane of rotation of the magnetic rotor, preferably between the first rotor region and the annular chamber (FIG. 10.82). One of the terminals of each solenoid perpendicular to the rotor is connected to the same terminal of the solenoid parallel to the plane of the rotor. The second terminal of the parallel solenoid is connected to the electrically conductive rotor. The second terminal of the perpendicular solenoids is connected to one of the electrodes of the wall located in the plane of rotation of the conductive current rotor. In certain embodiments, the pipe that forms the R_smo is conductive and replaces and directly performs the role of the electrode. The electrical circuit is produced so that all of the currents coming from perpendicular coils go toward the parallel coil at the same time and in the same direction. By rotating, the magnetic rotor causes the magnetic fields of the opposite coils to vary symmetrically. The magnetic fields induced by the perpendicular coils are opposite, two-by-two, thereby limiting the twisting forces on the coil. The current induced in the four perpendicular solenoids passes into the parallel coil and generates a magnetic field varying at 2n times the speed of rotation of the magnetic rotor. The fact that the parallel coil is placed between the first rotor region and the annular chamber prevents excessive heating of the rotors. The pin of the rotors will be protected by a deflector, preventing excessive heating.

5.7 In a specific embodiment, the R_smo will be used to reduce the CO2 and oxidize the excess CH4 produced during the gasification and FT synthesis phase, into CO and H2. A CO2/CH4 or optionally CO2/CH4/H2O mixture will be suctioned by the first region of the rotors of the R_smo. The mixture may be enriched with carbon particles (char, coal) of 1 to 500 micrometers. Metal particles, such as manganese, manganese oxide, aluminum, magnesium, indium, titanium, iron, copper and so on or any other metal capable of increasing the amount of CO and H2 produced from the gas mixture may be added to the mixture.

Under the action of the electric arcs of the first stage, the gas molecules will be ionized so as to become reactive agents that will interact with one another and with the carbon particles according to the aforementioned reactions and r13 to r19.

The metals injected in the form of particles will be oxidized by the different reactive agent formed; they may be reduced under the action of the plasmas (light and current) and currents induced by the microwaves in the annular chamber.

As an example, we can cite the action of magnesium:

  r13

  r14

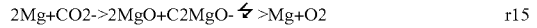  r15

  r16 or aluminum:

  r17

  r18

  r19

The carbon produced can be oxidized into CO by the CO2 or water, or by oxygen radicals produced in the reactor.

5.8 Aluminum powders are highly flammable and magnesium powders are even more so, making them very difficult to manipulate.

To be capable of enriching the gases and plasmas with metals without having to manipulate powders, a small block of the desired metal or metal alloy, generally any material desired, is introduced upstream or downstream of the first rotor region. The block is placed either against the wall of the pipe of the R_mos or on the thermal deflector at the level of the rotor pin. A window made of quartz or any other material transparent to the wavelengths used is arranged opposite the block. Through the window, a laser beam is focused on the block with a microscope objective or lens. The beam ablates the surface of the block. The frequency of the laser will be between 1 and $10^6$ Hertz with pulses on the order of 1 femtosecond to 100 nanoseconds. The laser ablation of the metal block will pulverize, at the inlet of the reactor, gases of material expelled from the block, which will pass through the R_smo and may react with the gas molecules as described in point 5.7. For sufficient laser powers (starting at 8 microjoules/square micron) and sufficiently short pulses of less than 10 nanoseconds, optical plasmas will form. These plasmas will further ionize the gases and the atoms of material expelled, making all of the elements highly reactive, by the creation of charged entities and/or free radicals. All of the wavelengths can be suitable for the ablations. However, wavelengths in the UV, for example at 266 nanometers, will be preferred. The kinetic energy of the gas is kept high owing to the rapid magnetic fields variations in the space located between the first rotor region and the annular chamber. The gas compressed by the action of the first rotor region and the increase in temperature enters the annular chamber where the microwaves coming from the magnetrons increase the temperature.

5.9 In a specific embodiment, the metals and particles used to enrich the gases are current conductors. Under the action of the microwaves in the annular chamber, electric currents are induced in the particles in suspension in the gas. These induced currents will cause electric arcs between particles or with the walls of the R_smo reactor, thereby producing plasmas of electric origin in the gas. These plasmas will generate activated elements that, by reacting with one another, with the gas, and with the carbon or metal particles, will produce CO and H2 by the reactions described above. The plasmas generated by the electric current arcs induced are by nature non-equilibrium plasmas.

5.10 In a specific embodiment, the distance between the base of the annular chamber and the first rotor of the second rotor region (turbine region) will be equal to $n*\lambda+\phi$ with n being a natural integer, $\lambda$ being the wavelength of the microwaves and $\phi$ being the dephasing induced by the reflections on the wall or the rotor. This first rotor will be made of a material conducting the electric current and reflecting the microwaves. The diameter of the rotor will be, for example, equal to $0.5\lambda$. The pin passing through the rotors will be made of a composite material, with the largest portion being made of an electrically insulating material. However, the second region of the pin is made, over a length of $\lambda/4$ starting from the first rotor toward the annular chamber, of an electrically conductive material or a material coated with an electric conductor. The waveguides of the magnetron(s) will direct the microwaves into the annular chamber, which will be reflected partly toward the first rotor of the second rotor region. In certain embodiments, the waves, at the outlet of the waveguides, are directed toward the first rotor. The rotor and the conductive part of the pin will act as a microwave antenna. This will have the effect of producing currents induced in the rotor and in the part of the conductive current pin. These currents will cause electric arcs between the antenna and:

the electrodes arranged near the antenna rotor,
the particles contained in the gas, and the gas itself,
the other rotors optionally grounded,
the walls of the R_smo.

In addition, due to the distance between the annular chamber and the antenna, the microwaves may adequately excite the carbon and optionally the metal particles introduced into the gas, so as to form a plasmoid (or a plasma). Then, there will be a reduction of the CO2 and an oxidation of the carbon and the CH4 so as to produce CO and H2. When the reactor R_smo is in action, the gases optionally enriched with carbon particles (and optionally other elements) are suctioned by the first rotor stage. At this level, an activation of the gases begins under the effect of the electric arcs produced between the conductive blades and the electrodes implanted in the wall of the reactor. Then, the gases are compressed upstream of the annular chamber, and optionally heated by a magnetic field varying parallel to the rotor pin and causing the rotation of the magnetic blades and the solenoids. The gases then pass into the annular chamber where they are significantly heated under the action of the microwaves so as to form a thermodynamic plasma containing non-equilibrium plasmas due to the induced electric arcs. The heated and ionized gases actuate the rotors of the 4 second rotor region, which will drive the rotor pin, maintaining the operation of the R_smo reactor.

5.11 In one embodiment, the R_smo consists of a turbine and compressor system in two stages. A rotor system forming a low-pressure compression stage is connected by a rotation pin to a rotor system forming a turbine stage. These two rotor regions form the outermost rotor system of the reactor. Between the outer rotor stages, a high-pressure compression stage is inserted, connected by a hollow pin to a second turbine stage These last two stages form the innermost rotor system of the reactor. The rotation pin of the outer system is nested in the pin of the inner system. The hollow rotation pin is flared and folded, at the center of the reactor, to form an annular microwave chamber integral with the pin. The inner pin as well as the rotors are made of an electrically conductive material and are insulated from the outermost rotor system, which is connected to the ground. Under the action of the microwaves injected into the annular chamber, induced electric currents will be produced in the innermost rotor system. These currents generate electric arcs between the two rotor systems and between the innermost rotor system and the pipe of the grounded reactor. These electric arcs will activate the gases and the particles passing through the reactor as described in the previous sections. The various embodiments described for the R_smo can be combined in numerous variants. In certain embodiments, the space located between the two rotors will be filled with oil or a liquid enabling a hyperboloid coupling between the two systems. The pins will, for example, be equipped with blades (inside the hollow pin of the innermost system and the surface of the pin of the outermost system) so as to amplify this coupling. In certain embodiments, the turbine stage of the outermost system is removed. The low-pressure compression system is coupled with the rest of the rotor system (corresponding to the inner rotor system) by nesting the pins.

In certain embodiments, the compressor of the innermost system consists of a centrifugal compressor of which the back of the ribbed portion (cone equipped with blades or grooves: impeller) is joined to the annular chamber.

5.12 In general, a R_smo is used as a complementary or main reactor for gasification of carbon so as to oxidize it into CO and produce H2. Under these conditions, steps of filtering, bubbling, differential diffusion through membranes, cyclone separation, cryogenic separation, or any other separation and purification process, can be performed so as to purify the syngas obtained and remove the particles and the metals contained in the syngas.

5.13-1 In a specific embodiment, the gasification performed in a R_smo (optionally a Tb_smo) is performed with SiO vapor.

CO2 gas is heated, for example, in a R_smo reactor to a temperature of between 500° C. and 2000° C. As CO2 is not polar, H2O is optionally added to the CO2 to obtain a more effective heating gas mixture.

The gas or gas mixture is placed in contact with a mixture of Si (silica) and SiO2 (silicon) particles. The Si and SiO2 particles will have a size of between 1 nanometer and 5 millimeters. The particle size will be either uniform or non-uniform according to the embodiment of the process.

Under the action of the heat and the gas, the following reactions will take place in varied proportions:

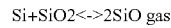

Si+SiO2<->2SiO gas

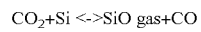

CO$_2$+Si <->SiO gas+CO

CO$_2$+Si <->SiC+O$_2$ minority

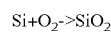

Si+O$_2$->SiO$_2$

The gas mixture obtained is optionally superheated in a second R_smo, at a temperature of between 500° C. and 2000° C. As SiO has a dipole moment close to 1.54 D, it will be significantly heated by the microwaves.

Then, the gaseous mixture is placed in contact with carbon particles having a uniform or non-uniform size of between 1 nanometer and 2 centimeters, according to the embodiment of the process.

Under the action of the gas mixture, the following reaction takes place:

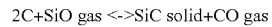

2C+SiO gas <->SiC solid+CO gas     r20

This last reaction can be performed in a Tb_smo or a R_smo combined with a cyclone enabling the particles of the CO2/CO gas mixture obtained to be isolated.

5.13-2 In an alternative process, the heating gas used will be methane CH4 instead of CO2. The gas will be heated, for example, in a R_smo (optionally a Tb_smo) at a temperature of between 500° C. and 2000° C. As CH4 has very low polarity, it will optionally be mixed with a small amount of H2O.

The following reactions will take place in varied proportions:

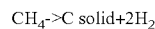

CH$_4$->C solid+2H$_2$

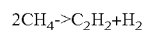

2CH$_4$->C$_2$H$_2$+H$_2$

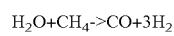

H$_2$O+CH$_4$->CO+3H$_2$

The gas mixture at the outlet of the R_smo is placed in contact with a mixture of Si (silica) and SiO$_2$ (silicon) particles according to the process described in point 5.13-1. The following reactions will take place:

Si+SiO$_2$<->2SiO gas

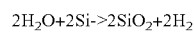

2H$_2$O+2Si->2SiO$_2$+2H$_2$

Si+CH$_4$<->SiC+2H$_2$ minority

Si+C->SiC minority

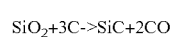

SiO$_2$+3C->SiC+2CO

SiO$_2$+3CH$_4$->SiC+2CO+6H$_2$

Then, the gaseous mixture is placed in contact with carbon particles according to the process described in 5.13-1, and the reaction r20 takes place.

5.13-3 In an alternative process, the heating gas used will be H2O, which will be heated in a R_smo (optionally a Tb_smo) at a temperature of between 500° C. and 2000° C. The gaseous mixture is then placed in contact with a mixture of Si and SiO2 particles according to the process described in 5.13-1.

Under the action of the heat and gas, the following reactions take place:

$$Si+SiO_2 <\text{-}> 2SiO \text{ gas}$$

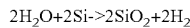

$$2H_2O+2Si \text{->} 2SiO_2+2H_2$$

Under certain conditions, $SiO_2$ will be produced during the reaction from silica Si alone.

Then, the gaseous mixture is placed in contact with carbon particles according to the process described in 5.13-1, and the reaction r20 takes place.

The syngas obtained (H2, CO, C2H2, CO2) or (CO, CO2) may be purified and balanced by adding water vapor.

The C2H2 has a water solubilization coefficient (76.6 $10^{-3}$ moles/liter at 0° C. and 1.013 bar) close to that of CO2, and can therefore be separated from the rest of the molecules according to the process described in 4.2

The SiC produced during the various gasification reactions will be used as an FT reaction catalyst.

6.1 At the outlet of the R_smo, the gases are cooled in heat exchangers, and purified to remove the particles and residual CO2. The syngas is balanced, brought to the desired temperature by a Tb_smo or other means before being injected into the FT reactor.

At the outlet of the FT reactor, the hydrocarbon and alcohol mixture is heated in a F_smo.

In a preferred embodiment, to obtain a better microwave action, a certain amount of water vapor is introduced into the hydrocarbon and alcohol mixture leaving the FT reactor. The mixture can also be heated by the heat coming from the heat exchangers. The hydrocarbon and alcohol mixture at the outlet of the F_smo reaches a temperature of between 200 and 600 C (preferably 370 C), sufficient for distillation in a distillation column.

In certain embodiments, flat or spherical mirrors or mirrors with a Fresnel organization will reflect the solar radiation on the distillation column.

In certain embodiments, optical lenses will cause the solar radiation to converge on the surface of the pipe of the F_smo or in the F_smo itself through a transparent window, so as to heat the hydrocarbon and alcohol mixture.

6.2 The methane obtained at the end of the distillation will be capable of being used as a fuel in the cyclone gasification reactor, and in the different reactors and reactions described above.

However, some of the methane produced by the FT synthesis may serve as a fuel for internal combustion engines actuating an alternator in order to produce some of the current used. The CO2 produced by the engines will be injected into the CO2 circuit of the syngas production system. The heat produced by the engines will also be recovered for the benefit of the production system.

6.3 In certain embodiments, the pressurized CO2 will be produced by combustion of methane in a gas turbine combined with a current generator or a turbo-generator. At the outlet of the turbine, after possibly passing into a Tb_smo to be superheated, the CO2 will supply the cyclones of the gasifier, the plasma reactor, the R_mos or any other reactor of the production system.

6.4 Some of the electric energy will be provided by solar panels. The solar panels will have quartz particles or quantum particles (quantum or Qdot) at their surface. These particles have the ability to transmit fluorescence in the infrared and in the visible under the action of UV radiation. This conversion of UV light into the visible and IR spectrum makes it suitable for use by classic panels.

In general, the Qdots can be integrated in the black coating of the reactor pipes in order to increase their light absorption capacity.

Another part of the electric energy necessary for operating the installation will come from wind energy.

Figure 14:
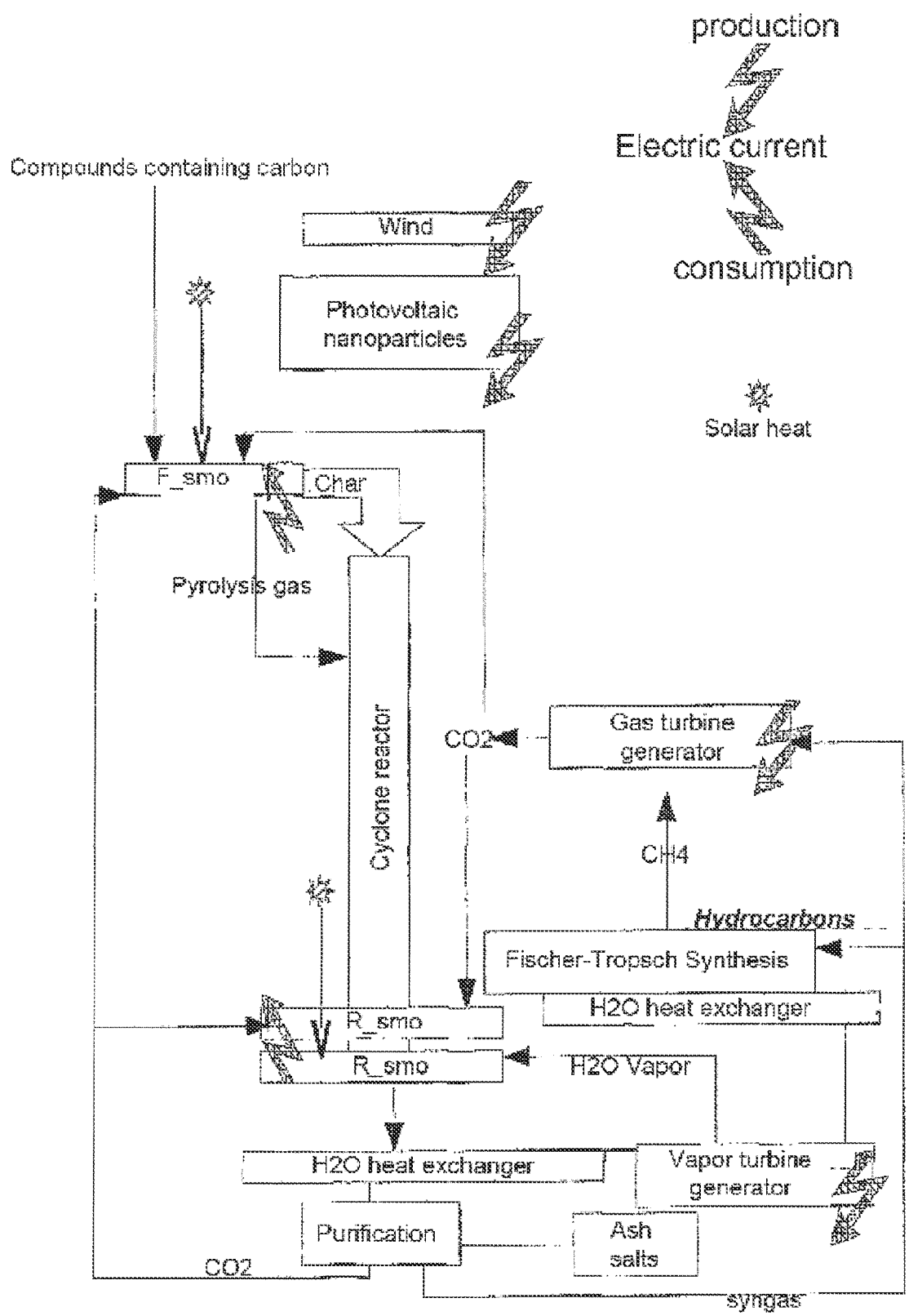
FIG. 14 shows an ideogram illustrating the process according to the invention.

In general, any type of electric current production can be suitable for satisfying the electric energy requirements of the process (FIG. 14). However, a non-polluting electric current production including the fuel cell system is preferable, so as not to hinder the pollution balance of the system.

Legends of All of the Figures

1) Solar/microwave furnace pipe
1a) Wall of the solar furnace
1b) Vacuum or insulating gas (argon, for example)
1c) Transparent wall of the confinement chamber
1d) Quantum particles on the wall of the confinement chamber, converting the UV solar radiation into visible and infrared radiation capable of passing through the wall
2) Worm screw
3) Mirror system
3a) Mirror inside the confinement chamber
4) Mirrors in a staircase arrangement in an ellipsoid section
5) Convergent or Fresnel lenses
6) Magnetron
7) Waveguide
8) Degassing pipes
9) Reactor core (FBCB)
10) Combustion chamber
11) Burners, tangential to the combustion chamber wall
12) Combustion gases eddying under the action of the combustion flames
13) Combustion flames
14) Air inlet
15) Inlet for granule pyrolysis gas
16) Inlet for additional gases such as CH4
17) Skirt forming a pierced cone facing downward: axial outlet of the combustion chamber for granules and gases, and axial inlet into the first cyclone
18) Skirt forming a pierced cone facing downward: axial outlet for the granules and gases of the first cyclone and axial inlet into the second cyclone
19) Skirt forming a pierced cone facing downward: axial outlet for granules of the second cyclone
20) Cone for closing skirt funnel openings. The cone is equipped with blades to create oblique passages toward the lower cyclone so as to cause the gases to rotate in the direction of rotation of the vortex of the cyclone.
21) Partial obstruction of the skirt funnel openings. A series of conduits arranged between the edge of the skirt and the cone structure forms passages between the two compartments.
22) Oblique conduit between the edge of the skirt and the cone for partially closing the skirt funnel opening
23) Edge of the skirt funnel opening 24) Blades creating oblique passages toward the lower cyclone
25) Views of a cone for closing skirt openings: cross-section and bottom view
26) Blades of the lower face of a cone for closing skirt openings
27) Pipe for tangential injection of gases into the cyclones
27a) Inlet for abrasive product into the pipe for tangential injection of gases into the cyclones
28) Cyclone with double axial and tangential inlet
29) Rising gas flow guide
30) Hollow T-structure
31) Base of the hollow T-structure: rising flow pipe
32) Gas outlet nozzle (horizontal nozzle): rising flow outlet in the inter-pipe space
33) Inner pipe of the reactor core
34) Outer pipe of the reactor core
35) Inter-pipe space
36) Oblique conduit of the axial inlet in the cyclone
37) Lower end of the inner pipe of the core: skirt having a round curvature
38) Partial closure of the lower end of the inner pipe: bi-cone
39) Screen with calibrated pores
40) Screen organized as a cone rising toward the inner pipe
41) Bi-cone closing the screened cone
42) Annular basket hollow at the center (opening)
43) Opening of the annular basket
44) Rotation pin of the annular basket
45) Impeller for attachment of the basket to the rotation pin
46) Conduits organized around a short screened cylinder formed by vertical metal rods
47) Vertical metal rods enabling the rising flow to form in the cyclone, the filtration of granules and the generation of induced electric current arcs
48) Blade forming oblique conduits
49) Oblique conduit imparting a rotation movement on the particle-charged gases
50) A: Rising flow cylinder, and B) pierced cone for rising flows
51) Blade arranged on the outer edge of the annular basket and facing the inside of the basket
52) Helical spring electrode attached to a ring electrode
53) Base of the spring electrode ending with a ring structure closing the last turn on itself
54) End of the spring electrode cured so as to return to the middle of the spiral of the spring, so as to form a central pin
55) Cyclone with helical electrode: GlidArc
56) Star structure connecting the pins of the GlidArc cyclones thus enabling the springs to be simultaneously actuated
57) GlidArc cyclone arranged in a rose shape around the opening of the skirt of the last cyclone ending the inner pipe of the FBCB_dc
58) Cap for closing cyclones. A: side view, B: bottom view
59) Rising flow outlet cylinder in the GlidArc cyclone
60) Oblique slot for axial supply of the GlidArc cyclone
61) Oblique blade surrounding the axial supply slots of the cyclones
63) Conduit for axially supplying GlidArc cyclones from outlet conduits of the upper stage cyclone
64) Pipe for tangential supply of the GlidArc cyclone; the pipe opens into the inter-pipe space opposite the vortex of the outer pipe near the wall thereof
65) Pipe for guiding rising flows
66) Blades arranged between the outer pipe and the flow guide
67) Base of the combustion chamber
68) Screen for obstructing the base of the gasification reactor
69) Semi-conical structure
70) Ash tank of the gasifier
71) Gas/particle separation cyclone
72) Walls of the Tb_smo
73) Rotor region located on the first third of the compressor pin
74) Rotor region located on the last third of the pin
75) Ovoid rotor pin
76) Annular chamber for confinement of microwaves
77) Rotor consisting of four electrically conductive blades in contact with the pin, in which the remaining blades are electrically insulated from the pin
78) Four electrodes at 90° with respect to one another, perpendicular to the plane of rotation of the rotor
79) The magnetic blades are arranged in a cross pattern, in which two symmetric blades have an opposite polarity "N/S"
80) Four solenoids arranged perpendicularly to the plane of rotation of the rotor containing the magnetic blades
81) Rotor with magnetic blades having a central symmetry, in which two symmetric blades have the same polarity at the ends "N/N" or "S/S"
82) Solenoid arranged parallel to the plane of rotation of the rotor containing the magnetic blades
83) Solar furnace with comb pattern
84) Microwave unit connecting a plurality of solar furnaces
85) Porous body
86) Loading of the substrate
87) Burners tangential to the wall of the combustion chamber
88) Suction wells
89) Inverted cone closing the last cyclone of the internal pipe
90) Ultrasound source
91) Ultrasound guide
92) Grounded impeller
93) Sets of four electrodes connected to an electric generator
94) Electrical insulator insulating the blades of the impeller from the electrodes 93
95) Blades
96) Impeller
97) Heat shield
98) Collection chamber
99) Impeller blade pin

The invention claimed is:

1. Process of gasification of carbon-containing compounds in order to produce a syngas containing primarily CO and H2, wherein it includes:

A) a first step of torrefaction pyrolysis of the compounds, into char and pyrolysis gas, in a solar microwave reactor, caused by heating the compounds contained in said solar microwave reactor by synergistic thermal energy provided jointly by the heating of the walls of the reactor owing to the concentration by convergence or reflection of solar radiation at the surface of said walls, and by microwaves injected directly into the reactor and compounds, and B) a second step of converting the char and pyrolysis gas, coming from the solar microwave reactor, primarily into CO and H2, by chemical oxidation-reduction reactions occurring in a cyclone reactor, in which said cyclone reactor enables the formation of a gaseous vortex driving and oxidizing the char particles, owing to the combustion of the pyrolysis gases or additional gas, the injection of heated gas or gas mixtures into the cyclone reactor, and the direct heating of the gases present in said reactor by microwaves injected directly into the cyclone reactor.

2. Process according to claim 1, wherein the gases used to produce the oxidation-reduction reactions are heated, accelerated and pressurized under the synergistic action of thermal energy resulting from the heating of the walls of a pressurization and acceleration heating reactor, by convergence and/or reflection of solar radiation at the surface of the walls of said reactor, and by microwaves injected into said reactor.

3. Process according to claim 1, wherein the cyclone reactors and/or the pressurization and acceleration heating reactors include means for producing gaseous plasmas and mixed gas/particle plasmas or plasmons.

4. Process according to claim 1, wherein microwaves are used at the same time as infrared radiation.

5. Process according to claim 1, wherein a gasification substrate includes heterogeneous particles comprising particles of compounds containing carbon, and additive particles promoting gasification, optionally agglomerated or mixed with the particles of the carbon-containing compounds.

6. Process according to claim 5, wherein the additive particles include reduction metals that promote gasification by oxidation-reduction reactions and the production of charged elements and free radicals by electric arcs produced by currents created in the particles, and also silica and/or silicon particles producing SiO capable of binding a portion of the carbon contained in the compounds in the form of SiC.

7. Device for implementing the process according to claim 1, wherein it includes a solar microwave torrefaction pyrolysis reactor and a cyclone reactor, in which the solar microwave torrefaction pyrolysis reactor comprises a pipe, means for moving the compounds inside the pipe of the solar microwave torrefaction pyrolysis reactor, means for concentrating and causing convergence of solar radiation at the surface of the pipe of the reactor, means for insulating the pipe of the reactor from the external environment, means for improving the thermal inertia of the pipe of the reactor, means for producing microwaves, and means for guiding microwaves, and in which the cyclone reactor comprises at least two cyclone units superimposed or nested and communicating with one another, devices enabling combustion creating gas vortices in the units, devices for lateral or tangential injection of gas into the units, creating gas vortices, means for producing microwaves and means for guiding microwaves.

8. Device according to claim 7, wherein it includes an oxidation gas pressurization and acceleration heating reactor comprising a pipe, means for concentrating and causing convergence of solar radiation at the surface of the pipe of the reactor, means for insulating the pipe of the reactor from the external environment means for improving the thermal inertia of the pipe of the reactor, means for moving the gases as optionally the particles along the pipe of the reactor, by compressing them, heating them and accelerating them.

9. Device according to claim 8, wherein the oxidation gas pressurization and acceleration heating reactor includes blade rotors, centrifugal and/or blade compressors, turbines, at least one annular chamber, and at least one microwave source optionally complemented by an infrared source so as to move, compress, heat and accelerate the gases.

10. Device according to claim 6, wherein it includes induced or non-induced electric current, optical and microwave devices for producing gaseous plasmas and/or mixed gas/particle plasmons.

11. Device according to claim 6, wherein it includes at least one magnetron and at least one waveguide for producing microwaves between 1 GHz and 300 GHz and guiding said microwaves.

12. Process according to claim 4, wherein microwaves are used at the same time as infrared radiation at frequencies corresponding to the absorption frequencies of the modes of asymmetric vibration of $CO_2$ molecules.

13. Device according to claim 7, wherein the pipe of the solar microwave torrefaction pyrolysis reactor or of the oxidation gas pressurization and acceleration heating reactor is made of a refractory material.

14. Device according to claim 8, wherein the pipe of the solar microwave torrefaction pyrolysis reactor or of the oxidation gas pressurization and acceleration heating reactor is made of a refractory material.

* * * * *